(12) United States Patent
Chi et al.

(10) Patent No.: US 10,168,821 B2
(45) Date of Patent: Jan. 1, 2019

(54) MOBILE TERMINAL AND CONTROL METHOD THEREOF

(71) Applicant: LG ELECTRONICS INC., Seoul (KR)

(72) Inventors: Jumin Chi, Seoul (KR); Jiyoung Park, Seoul (KR); Sujin Kim, Seoul (KR); Sunghye Yoon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 218 days.

(21) Appl. No.: 14/774,091

(22) PCT Filed: Aug. 22, 2013

(86) PCT No.: PCT/KR2013/007544
§ 371 (c)(1),
(2) Date: Sep. 9, 2015

(87) PCT Pub. No.: WO2014/175513
PCT Pub. Date: Oct. 30, 2014

(65) Prior Publication Data
US 2016/0041680 A1    Feb. 11, 2016

(30) Foreign Application Priority Data

Apr. 22, 2013 (KR) .................. 10-2013-0044425

(51) Int. Cl.
*G06F 3/041* (2006.01)
*G06F 3/14* (2006.01)
(Continued)

(52) U.S. Cl.
CPC ............ *G06F 3/0416* (2013.01); *G06F 1/163* (2013.01); *G06F 1/1652* (2013.01); *G06F 3/011* (2013.01);
(Continued)

(58) Field of Classification Search
CPC . G06F 3/01; G06F 3/011; G06F 3/013; G06F 3/014; G06F 3/017; G06F 3/0346;
(Continued)

(56) References Cited

U.S. PATENT DOCUMENTS 6,216,490 B1    4/2001  Radley-Smith
8,896,526 B1 *  11/2014  Park .................... G04C 3/002
                                          345/156

(Continued)

FOREIGN PATENT DOCUMENTS

EP    2150031    2/2010
EP    2357548    8/2011
(Continued)

OTHER PUBLICATIONS

PCT International Application No. PCT/KR2013/007544, Written Opinion of the International Searching Authority dated Jan. 20, 2014, 1 page.
(Continued)

*Primary Examiner* — Jason Mandeville
(74) *Attorney, Agent, or Firm* — Lee, Hong, Degerman, Kang & Waimey

(57) ABSTRACT

A mobile terminal and a control method thereof are provided. The mobile terminal according to one exemplary embodiment includes a main body covering at least one area of a wrist, a display disposed on a front surface of the main body, a sensing unit configured to sense flatness of the wrist and a direction that the wrist faces, and a controller configured to select a display area for displaying screen information on the display based on the flatness of the wrist and the direction that the wrist faces, sensed by the sensing unit.

20 Claims, 19 Drawing Sheets

(51) Int. Cl.
*H04B 1/3827* (2015.01)
*H04B 1/3888* (2015.01)
*G09G 5/14* (2006.01)
*H04M 1/02* (2006.01)
*G06F 3/01* (2006.01)
*G06F 1/16* (2006.01)
*G06F 3/0484* (2013.01)
*H04N 7/18* (2006.01)
*G06F 3/0346* (2013.01)
*G06F 3/0488* (2013.01)

(52) U.S. Cl.
CPC .............. *G06F 3/013* (2013.01); *G06F 3/017* (2013.01); *G06F 3/0346* (2013.01); *G06F 3/041* (2013.01); *G06F 3/0412* (2013.01); *G06F 3/04842* (2013.01); *G06F 3/04886* (2013.01); *G06F 3/14* (2013.01); *G09G 5/14* (2013.01); *H04B 1/385* (2013.01); *H04B 1/3888* (2013.01); *H04M 1/0268* (2013.01); *H04N 7/181* (2013.01); *G06F 2203/04102* (2013.01); *G09G 2340/0492* (2013.01); *G09G 2380/02* (2013.01); *H04B 2001/3861* (2013.01); *H04M 2250/12* (2013.01)

(58) Field of Classification Search
CPC .... G06F 3/041; G06F 3/0412; G06F 3/04842; G06F 3/0416; G06F 3/04886; G06F 3/14; G06F 2203/04102; G06F 1/163; G06F 1/1652; G09G 2380/02
USPC .......................................... 345/156–158, 173
See application file for complete search history.

(56) References Cited

U.S. PATENT DOCUMENTS

| | | | |
|---|---|---|---|
| 9,753,543 B2* | 9/2017 | Jeon | G06F 3/014 |
| 2008/0291225 A1 | 11/2008 | Arneson | |
| 2009/0327976 A1* | 12/2009 | Williamson | G06F 3/04883 715/863 |
| 2010/0029327 A1 | 2/2010 | Jee | |
| 2011/0086680 A1 | 4/2011 | Kim et al. | |
| 2011/0187681 A1 | 8/2011 | Kim et al. | |
| 2013/0154970 A1* | 6/2013 | Seo | G06F 3/0488 345/173 |
| 2013/0222270 A1* | 8/2013 | Winkler | H04M 1/0233 345/173 |
| 2013/0222271 A1* | 8/2013 | Alberth | G06F 1/163 345/173 |
| 2014/0160078 A1* | 6/2014 | Seo | G06F 3/017 345/175 |

FOREIGN PATENT DOCUMENTS

| | | |
|---|---|---|
| JP | 2005165129 | 6/2005 |
| WO | 2007069116 | 6/2007 |
| WO | 102141878 | 8/2011 |

OTHER PUBLICATIONS

European Patent Office Application Serial No. 13882960.1, Search Report dated Nov. 21, 2016, 6 pages.
The State Intellectual Property Office of the People's Republic of China Application Serial No. 201380075835.7, Office Action dated Sep. 29, 2017, 15 pages.

\* cited by examiner

[Fig. 1]
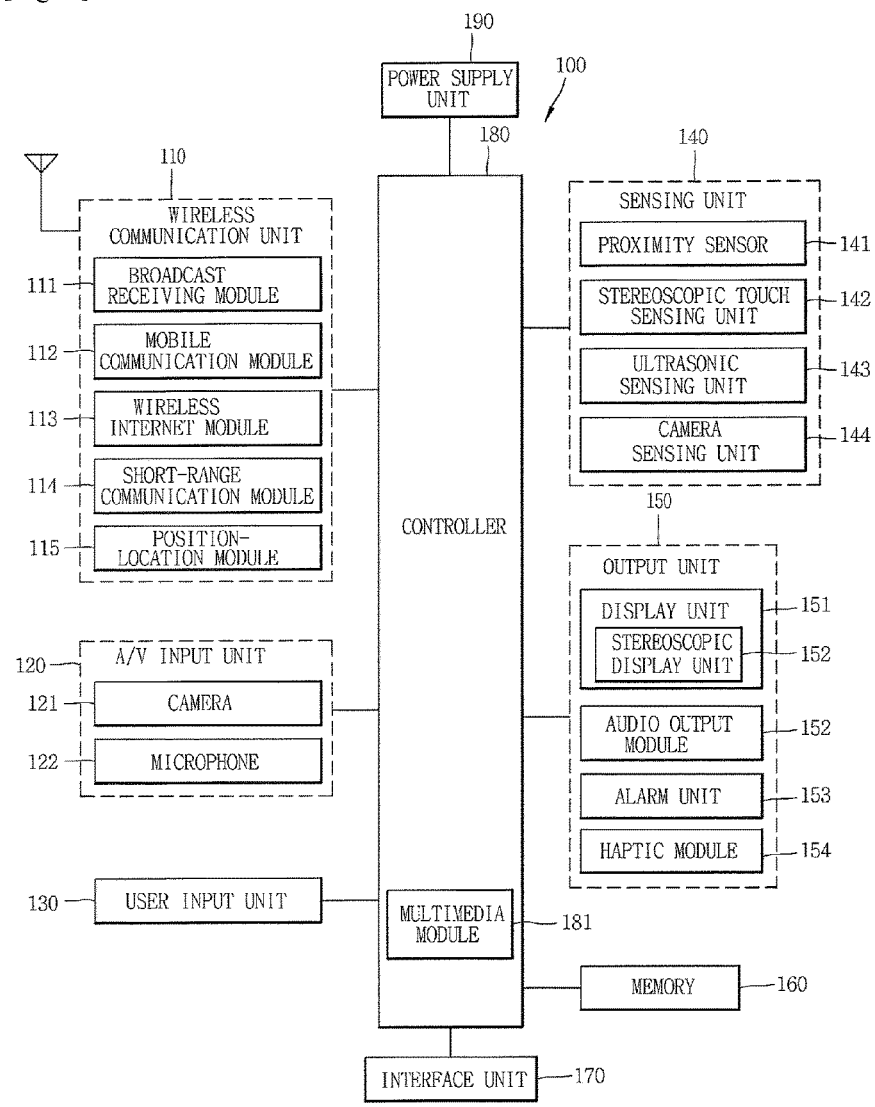

[Fig. 2A]
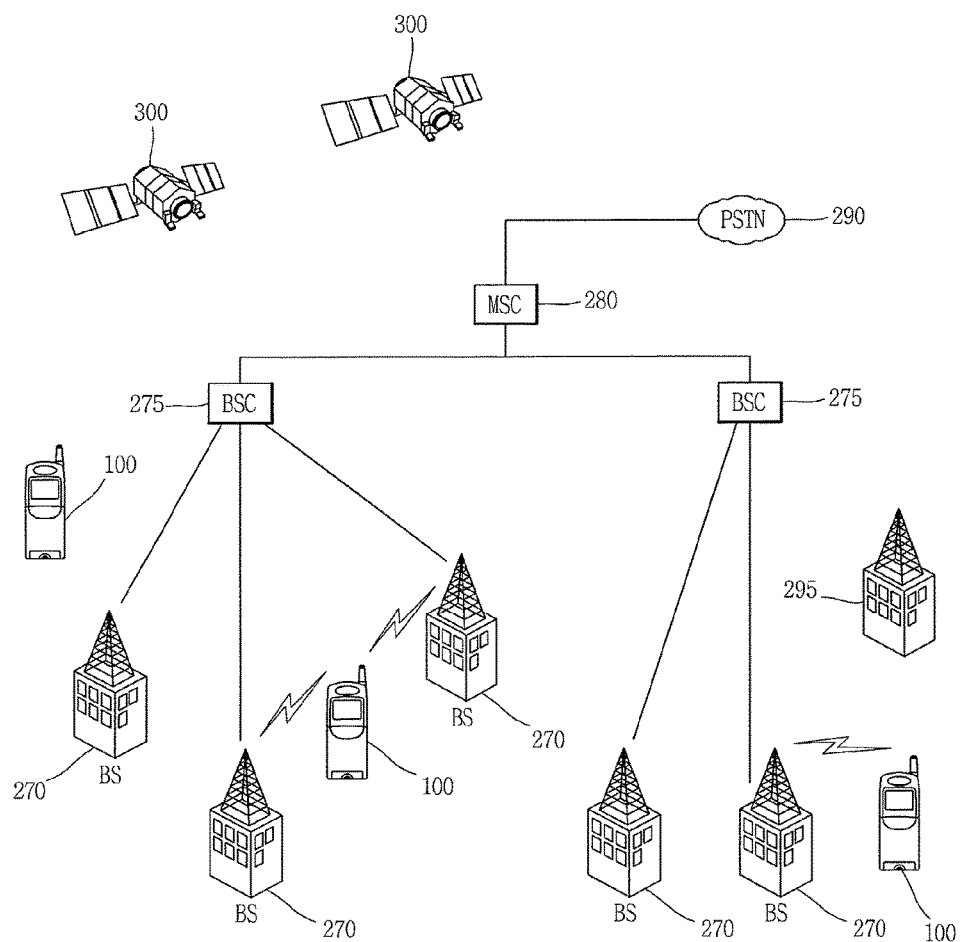

[Fig. 2B]
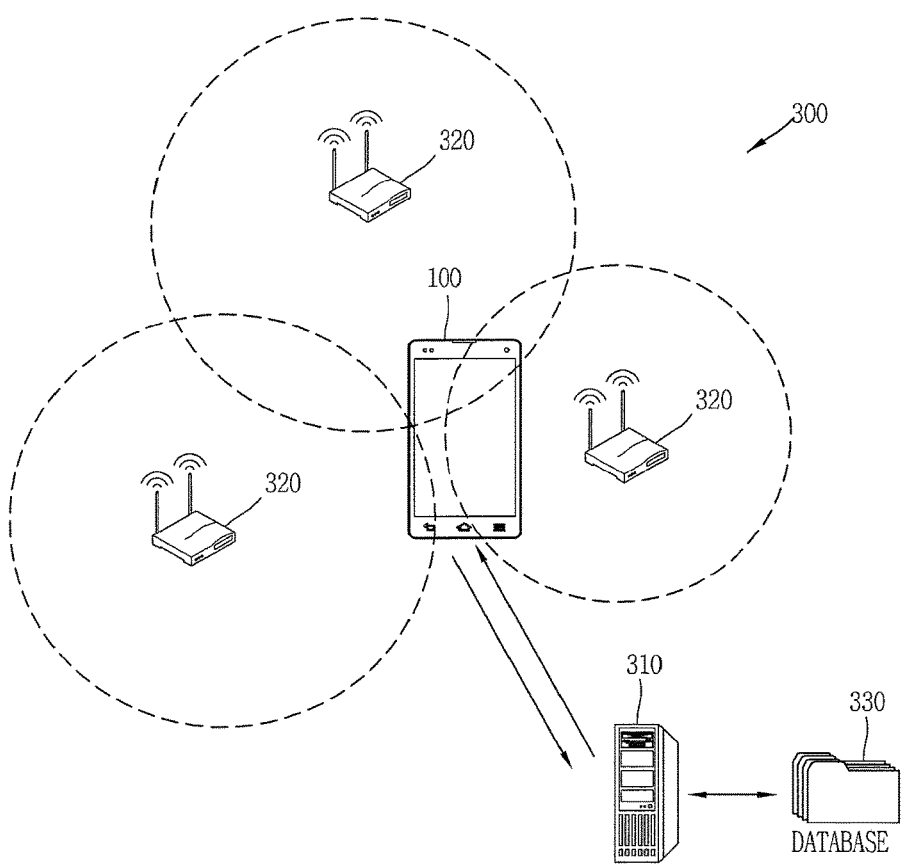

[Fig. 3A]
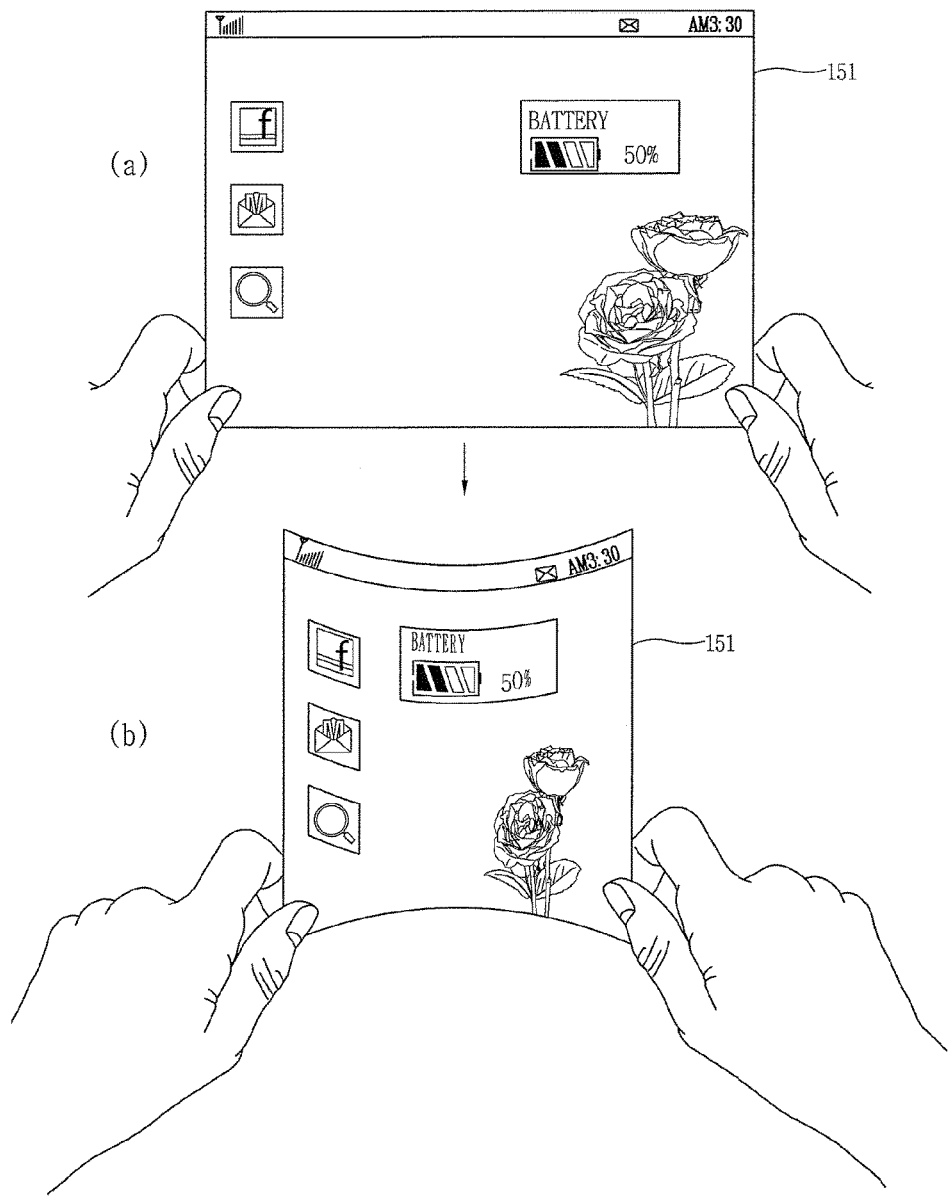

[Fig. 3B]
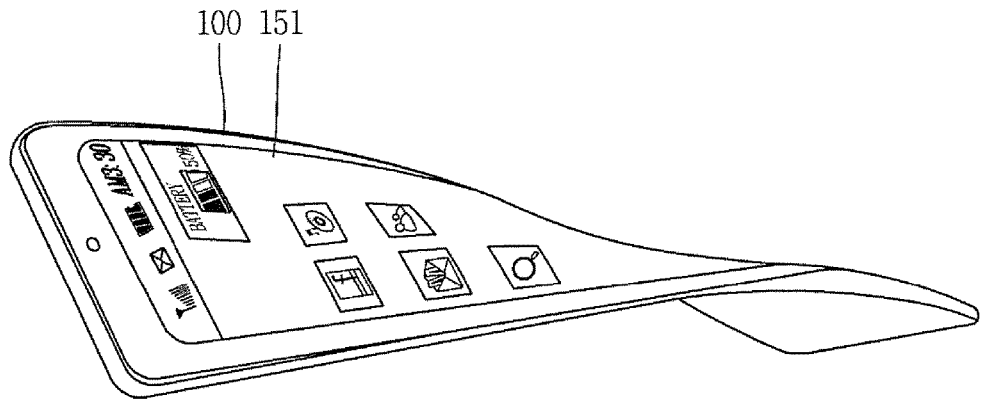
[Fig. 4]
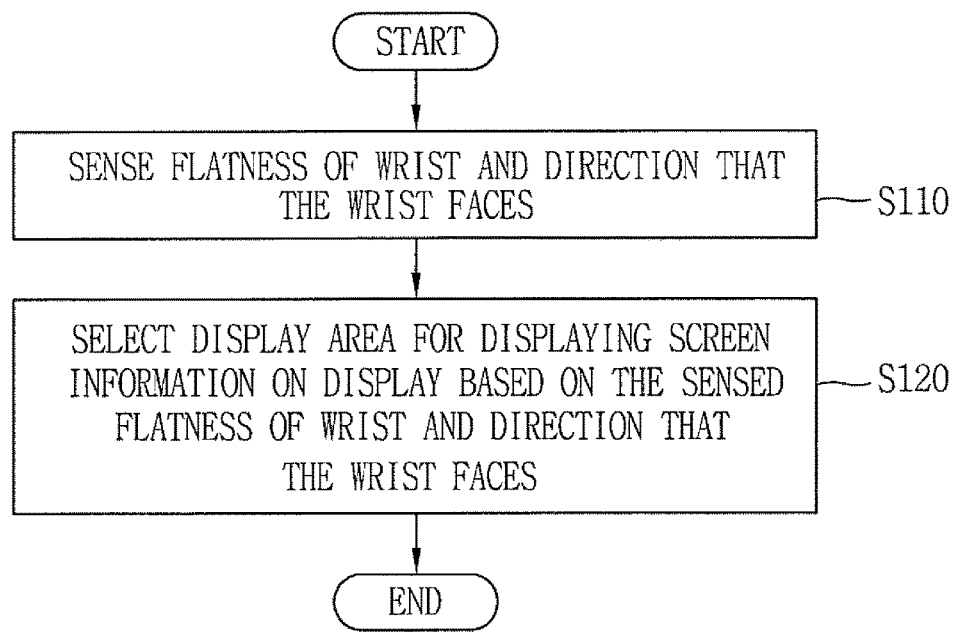

[Fig. 5]
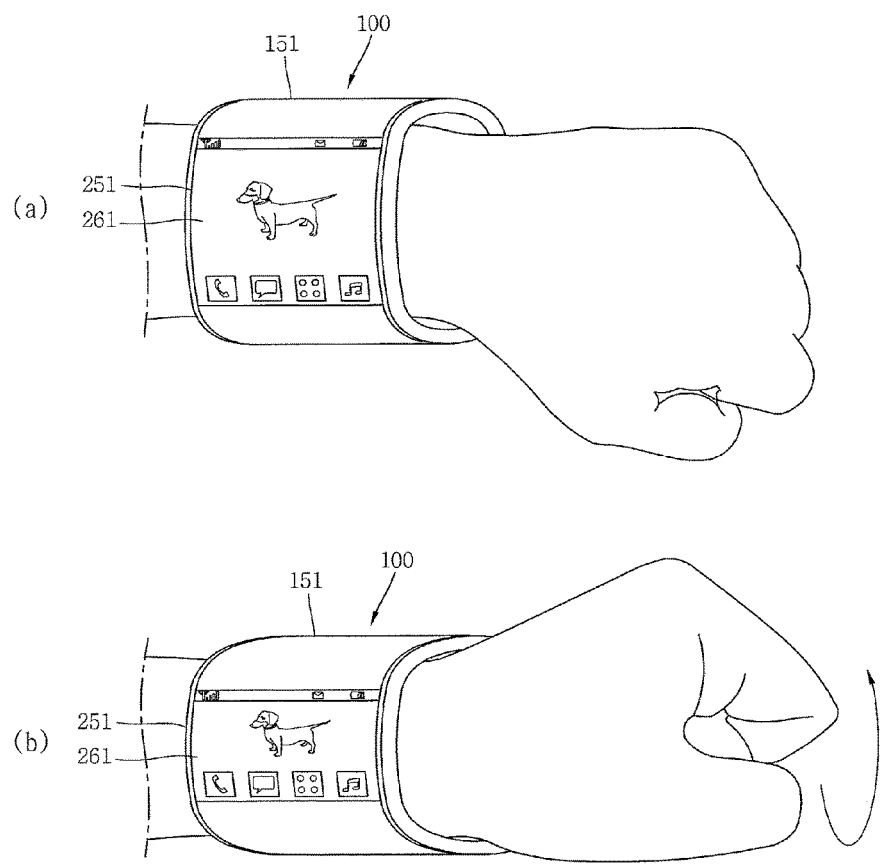

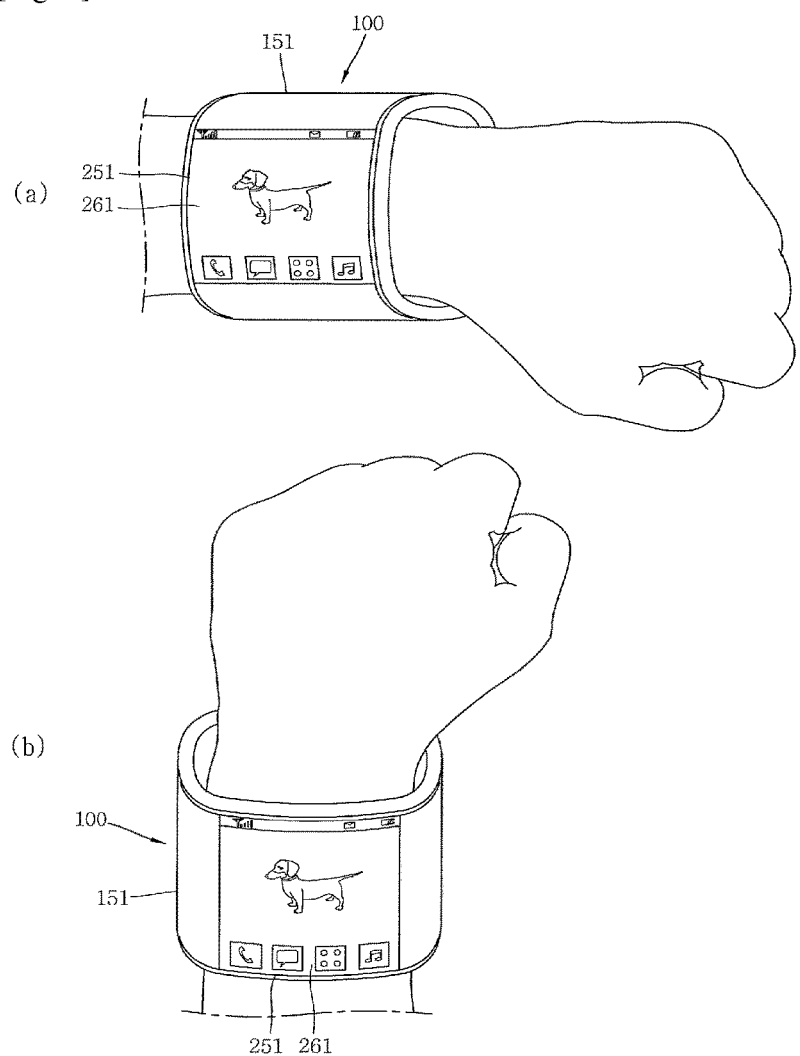
[Fig. 6]

[Fig. 7]
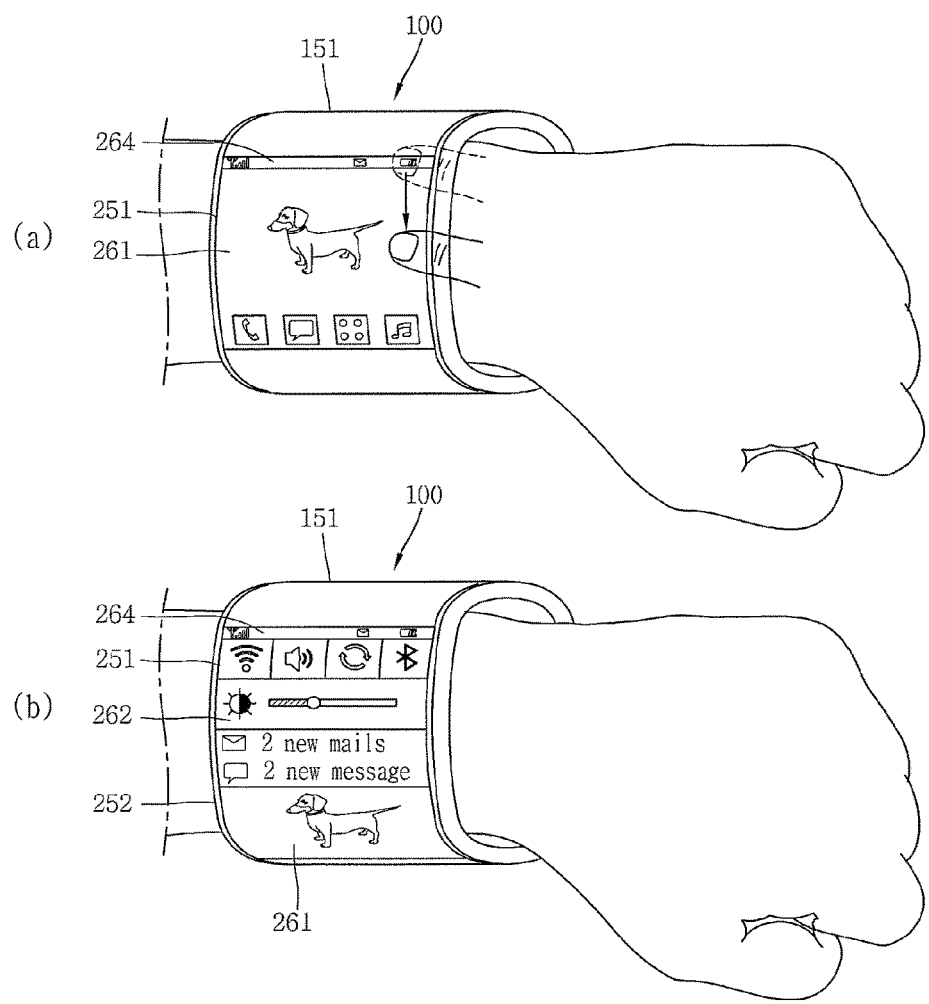

[Fig. 8]
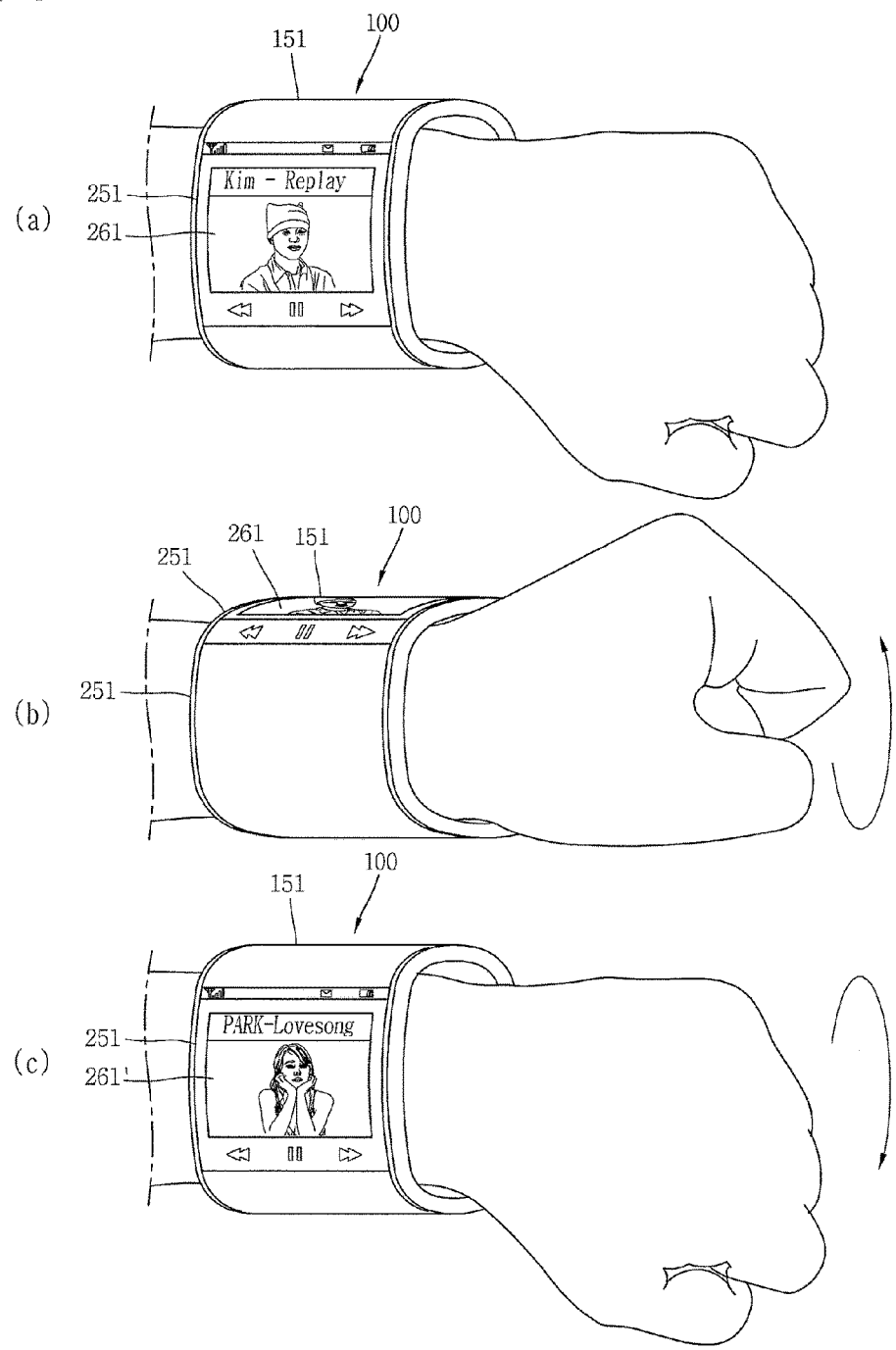

[Fig. 9]
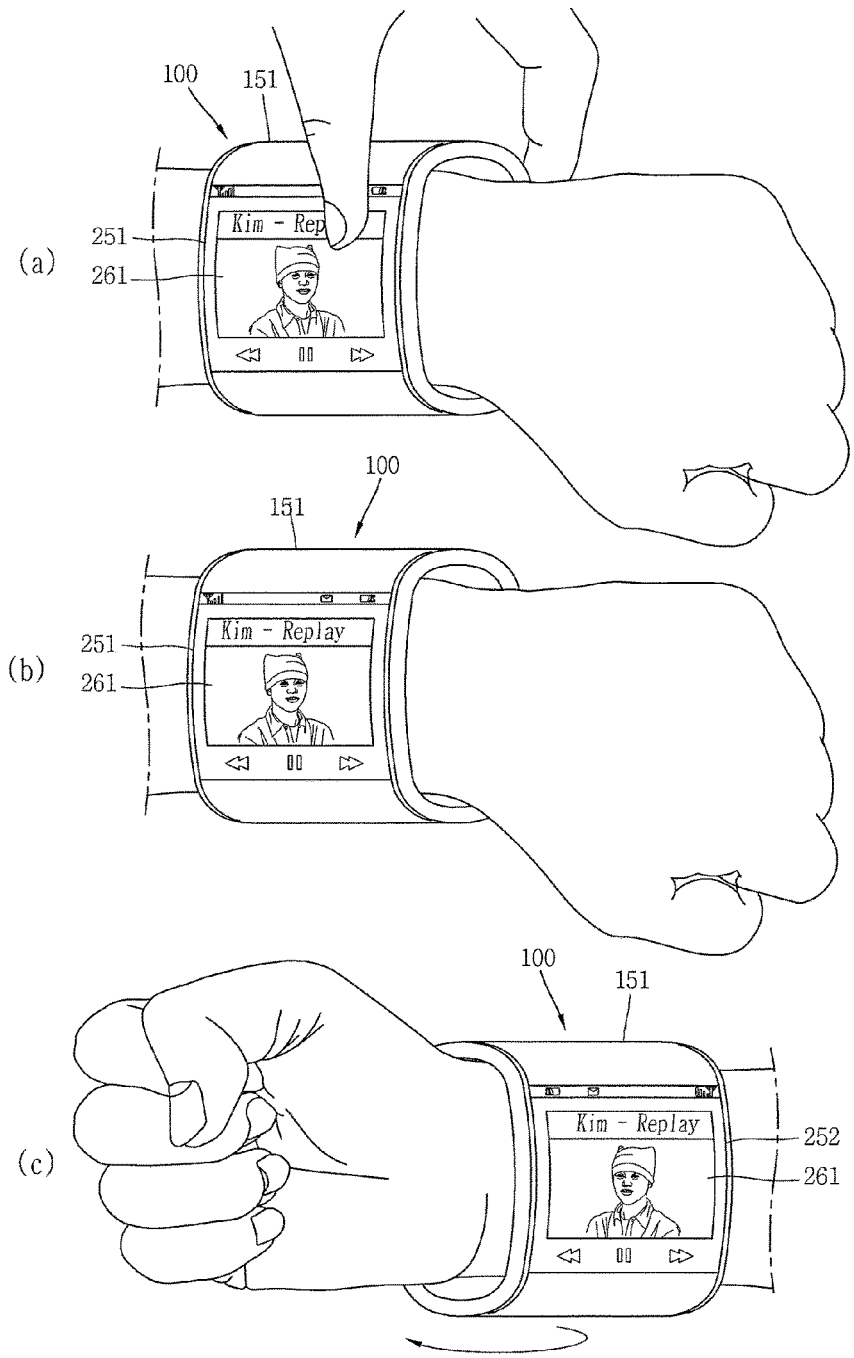

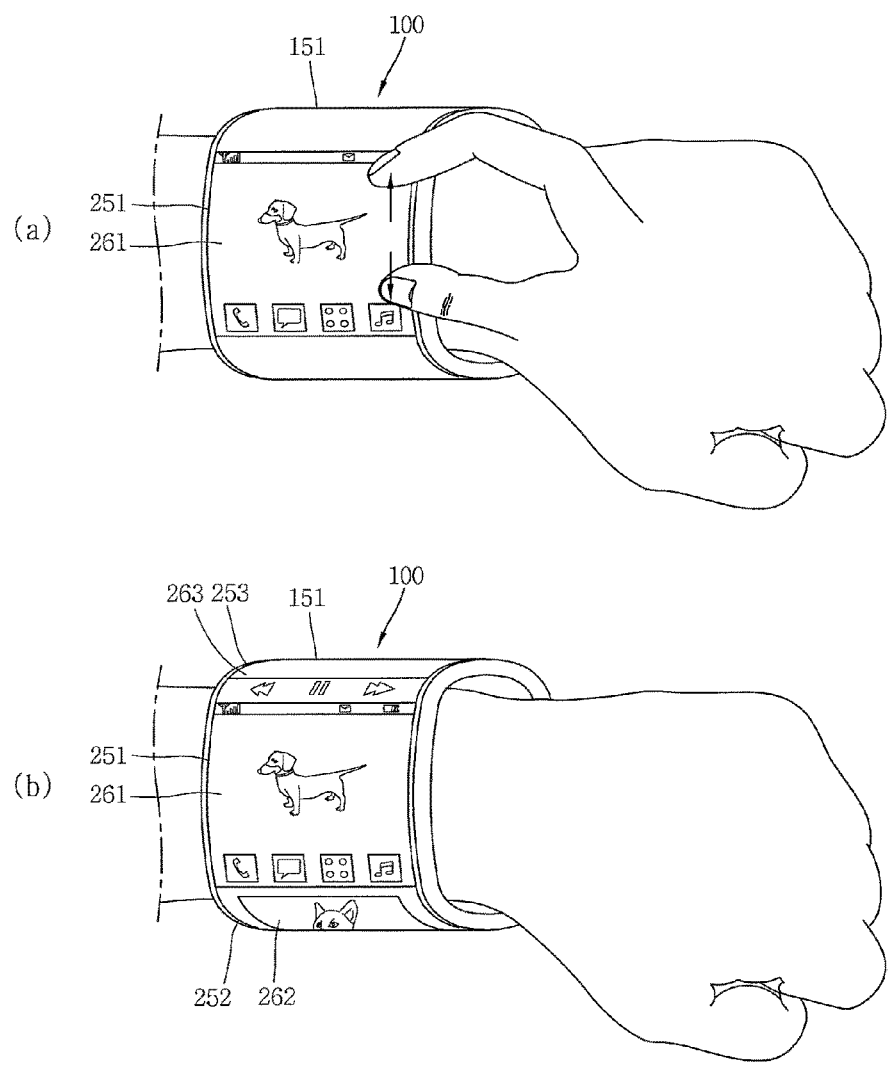
[Fig. 10]

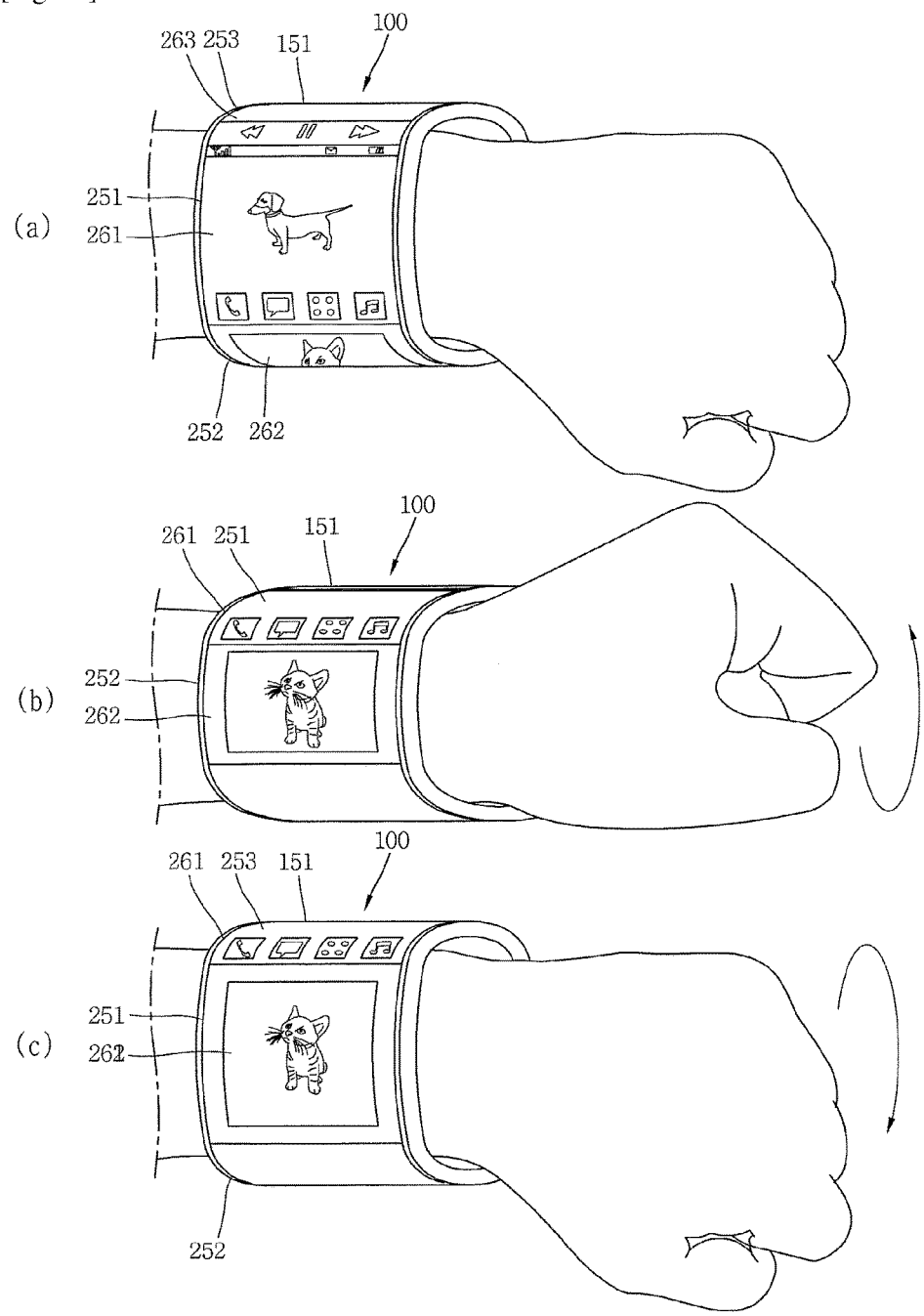
[Fig. 11]

[Fig. 12]
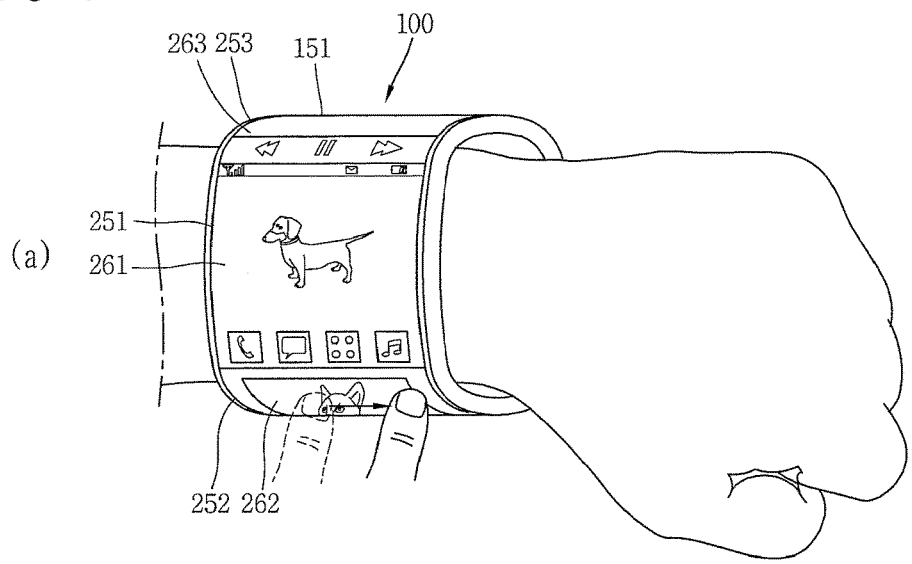
(a)
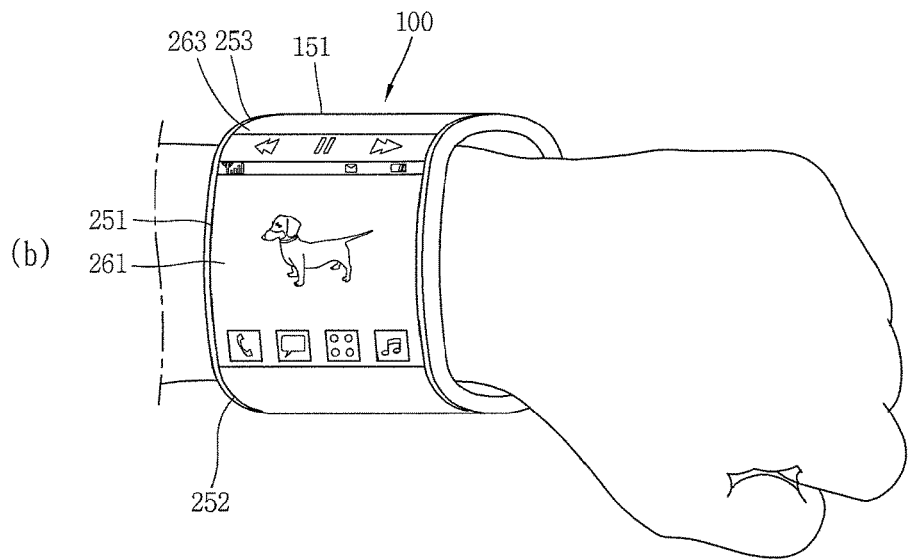
(b)

[Fig. 13]
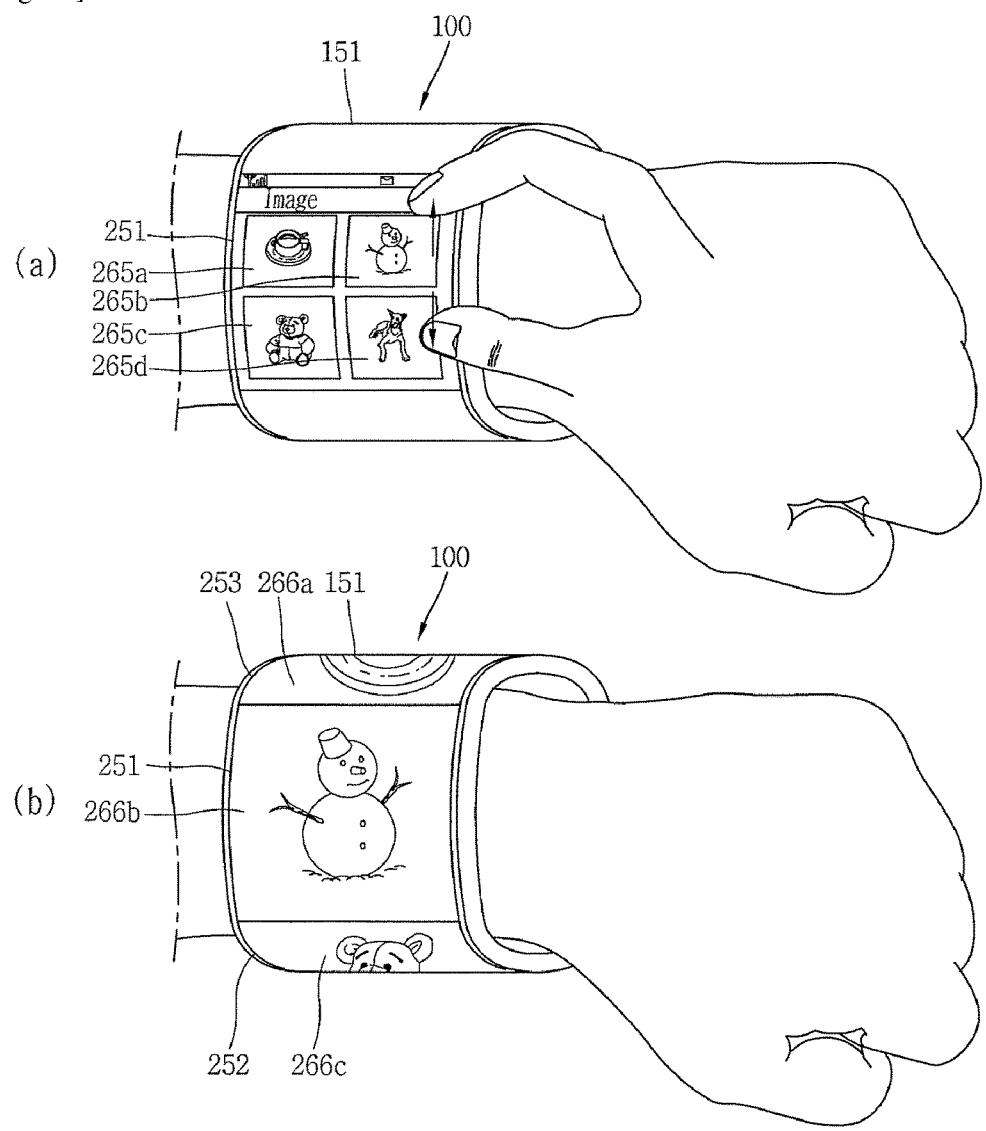

[Fig. 14]
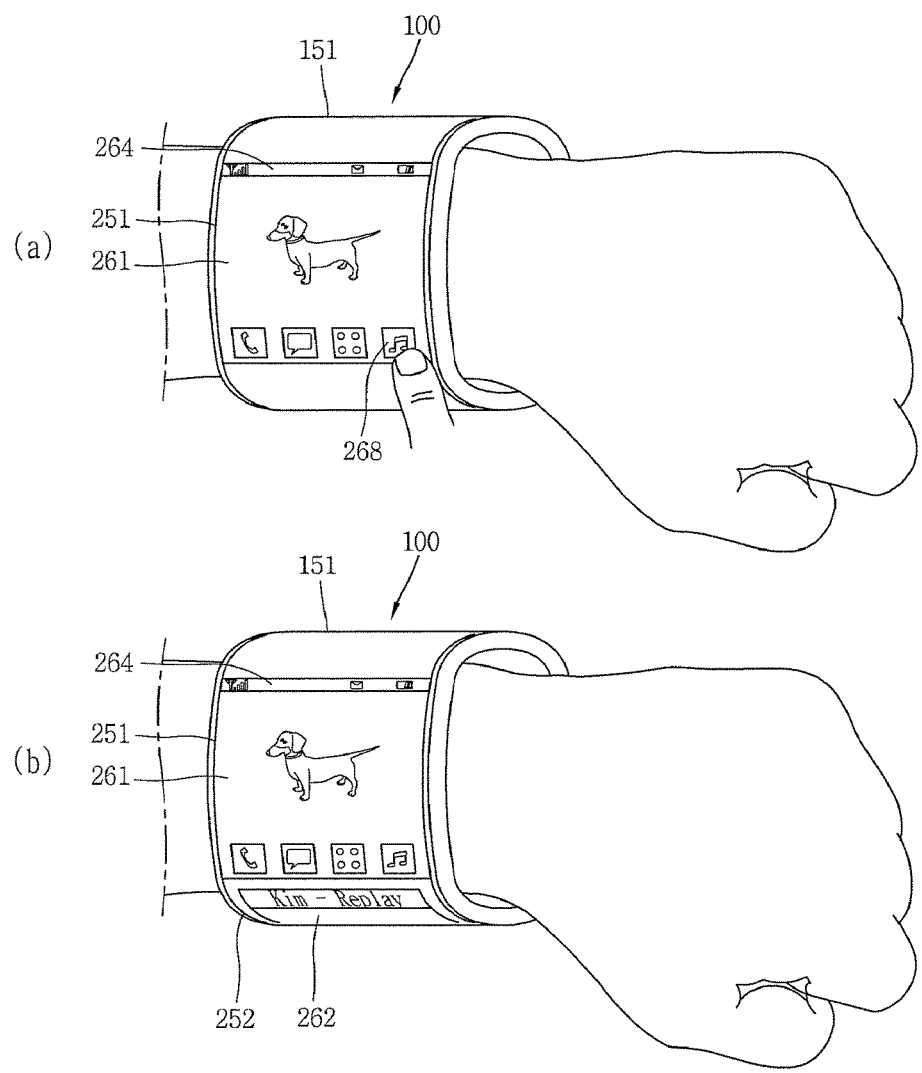

[Fig. 15]
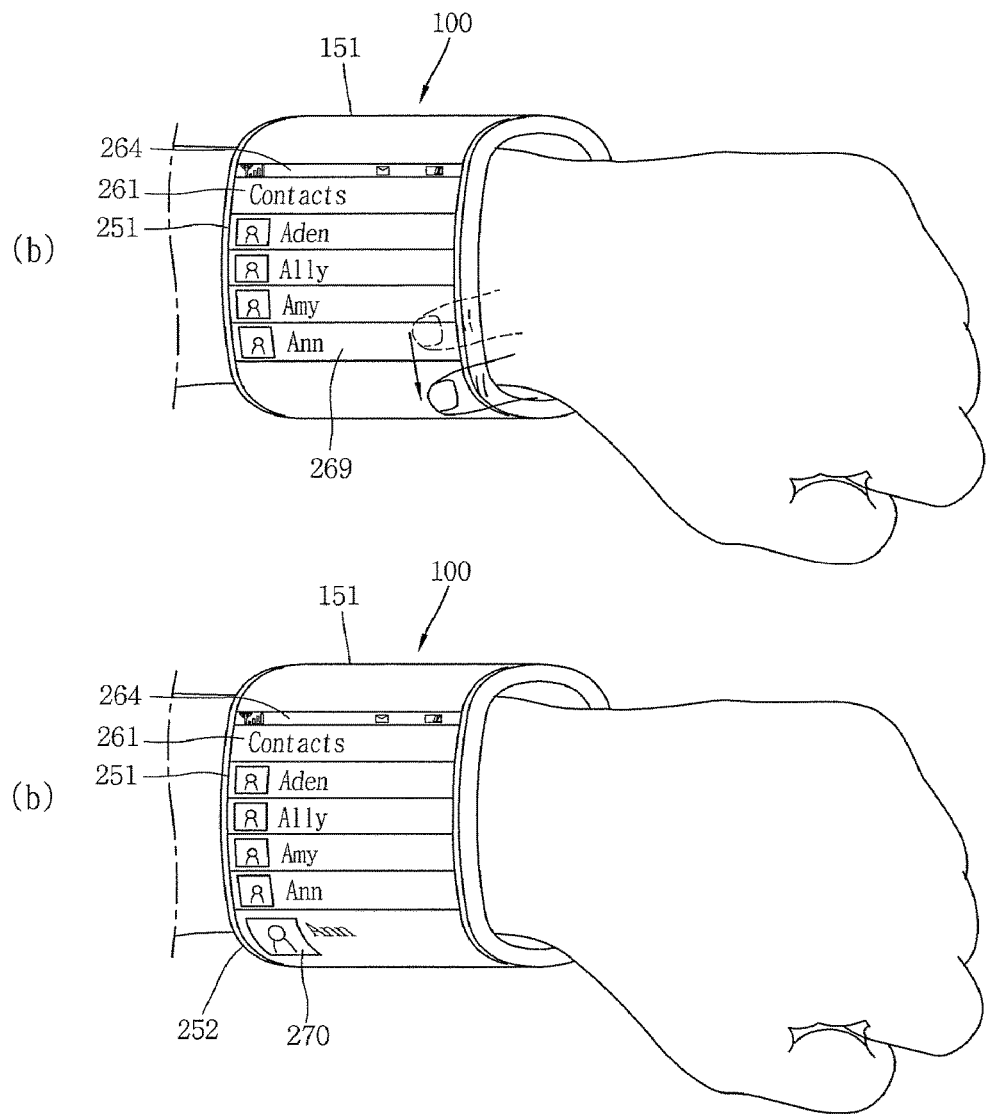

[Fig. 16]
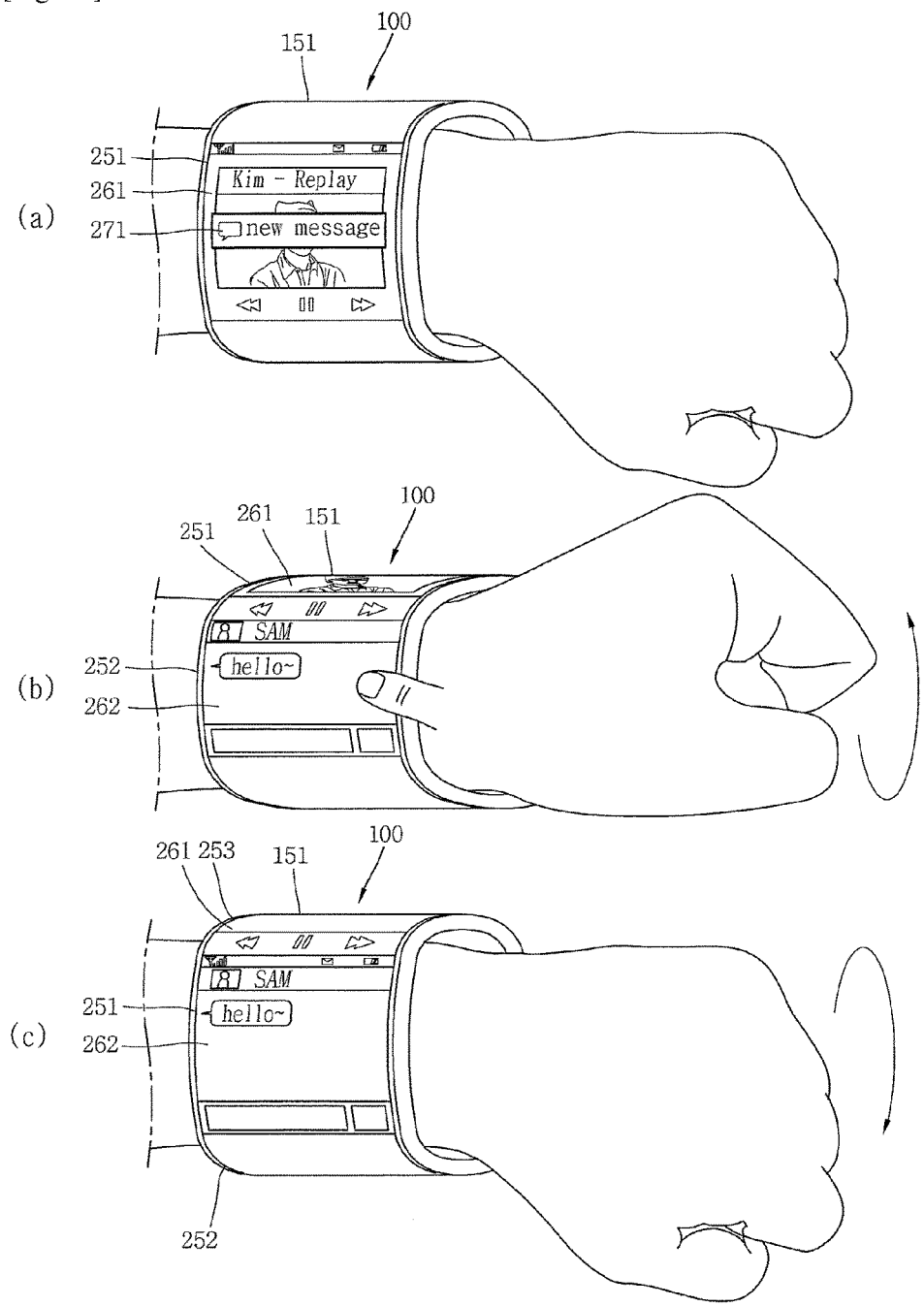

[Fig. 17]
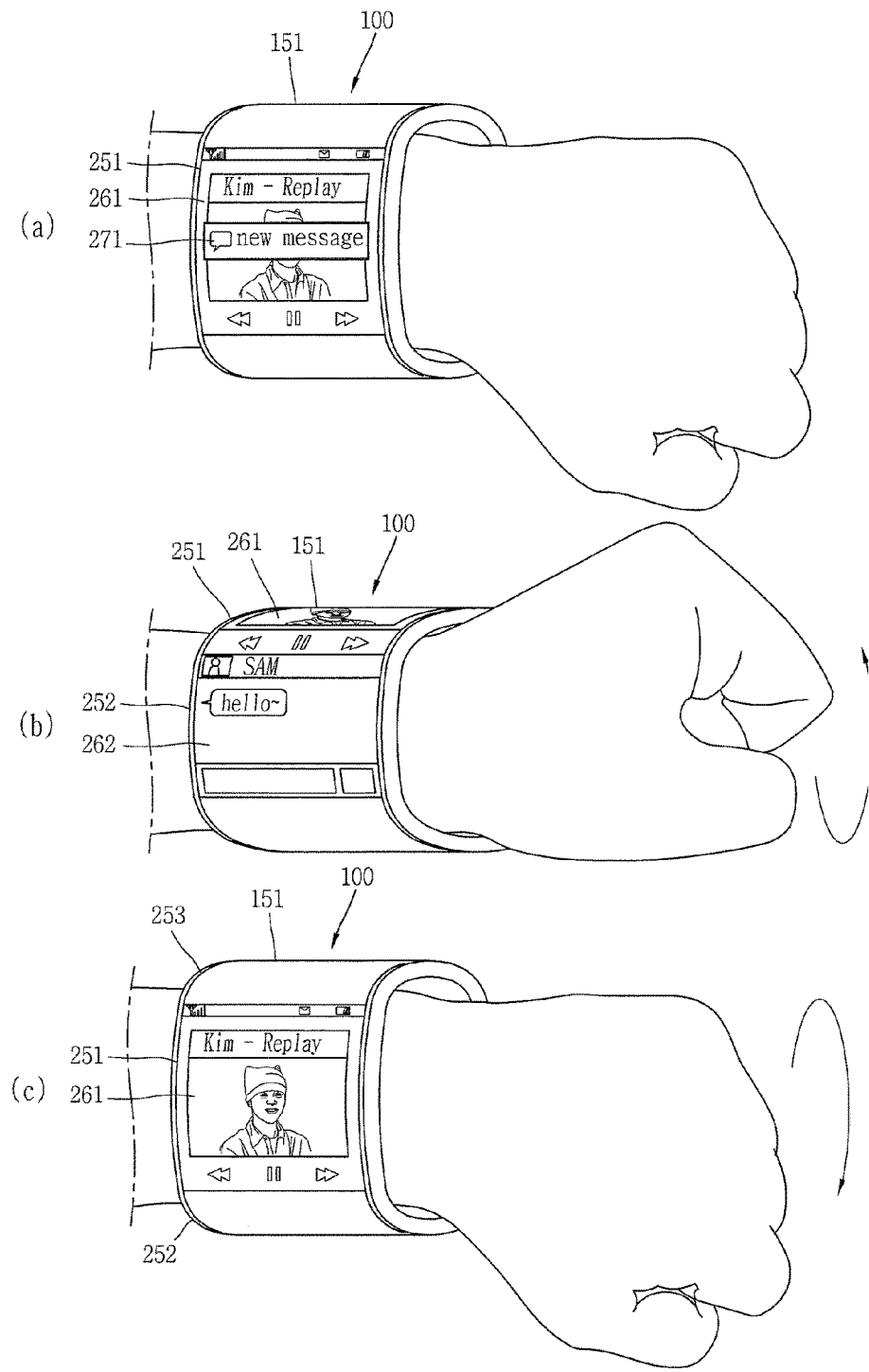

[Fig. 18]
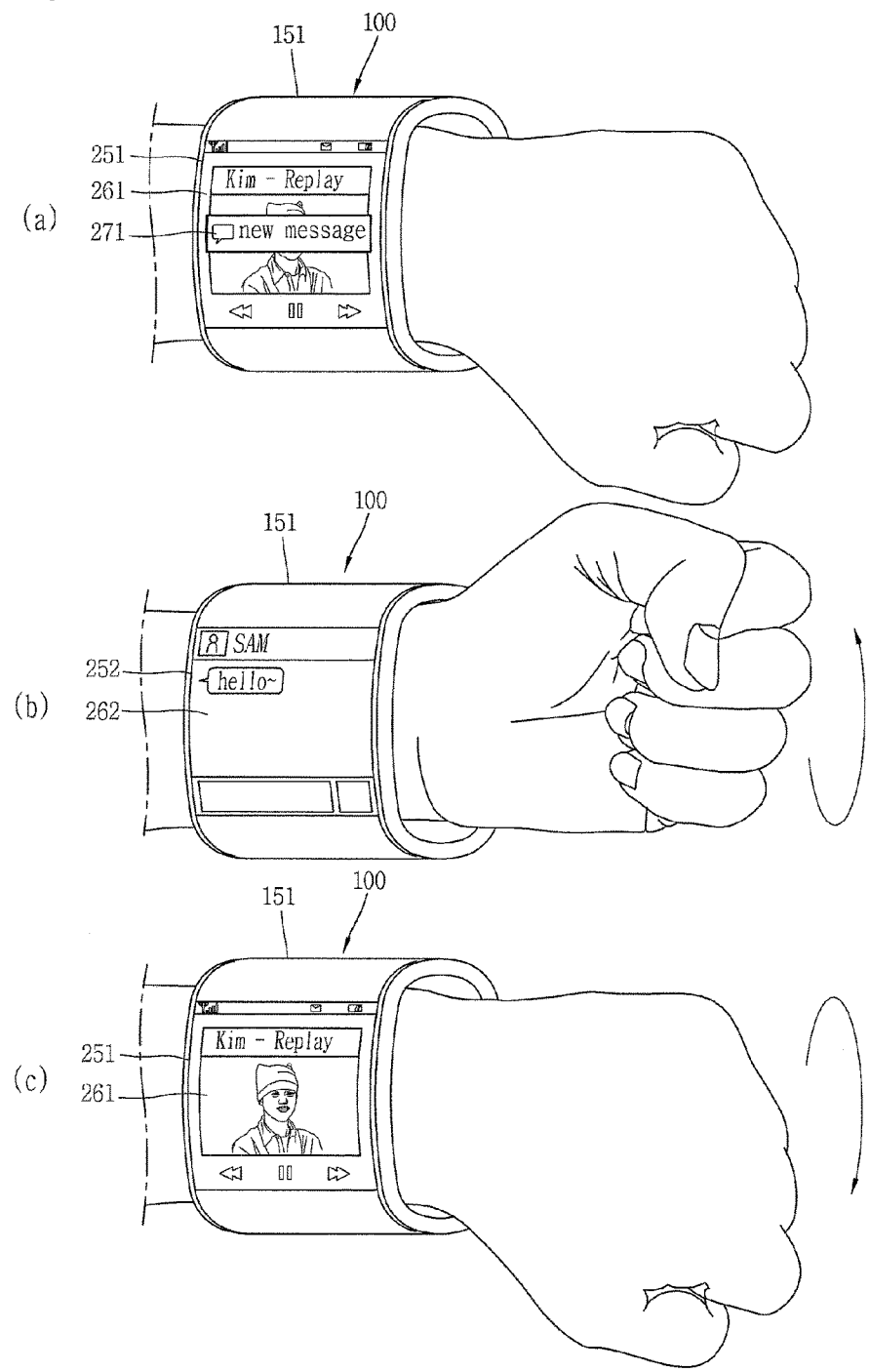

MOBILE TERMINAL AND CONTROL METHOD THEREOF

CROSS-REFERENCE TO RELATED APPLICATIONS

This application is the National Stage filing under 35 U.S.C. 371 of International Application No. PCT/KR2013/007544, filed on Aug. 22, 2013, which claims the benefit of earlier filing date and right of priority to Korean Application No. 10-2013-0044425, filed on Apr. 22, 2013, the contents of which are all hereby incorporated by reference herein in their entirety.

TECHNICAL FIELD

This specification relates to a mobile terminal, and particularly, to a mobile terminal capable of being worn around a wrist, and a control method thereof.

BACKGROUND ART

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player. Many efforts include not only changes and improvement of structural components implementing a mobile terminal but also software improvement to support and improve functions of the terminal.

With the improvement, the terminal has been evolved into designs of various shapes. Accordingly, a flexible display is in the limelight in view of its light weight and infrangible property. The flexible display may derive creation of new user interface areas to which the conventional glass substrate-based displays have been limitedly applied or unable to be applied. As the flexible display is highlighted, needs of user interfaces using the properties of the flexible display are increasing.

DISCLOSURE OF INVENTION

Technical Problem

Therefore, an aspect of the detailed description is to provide a mobile terminal, capable of improving user convenience in displaying screen information on a display of a mobile terminal worn around a user's wrist, and a control method thereof.

Solution to Problem

To achieve these and other advantages and in accordance with the purpose of this specification, as embodied and broadly described herein, there is provided a mobile terminal including a main body covering at least one area of a wrist, a display disposed on a front surface of the main body, a sensing unit configured to sense flatness of the wrist and a direction that the wrist faces, and a controller configured to select a display area for displaying screen information on the display based on the flatness of the wrist and the direction that the wrist faces, sensed by the sensing unit.

In accordance with an exemplary embodiment, the display may include a flexible display capable of being curved to cover the at least one area of the wrist.

In accordance with an exemplary embodiment, the sensing unit may include a flatness sensing sensor disposed on one surface of the display, to measure the flatness of the wrist by a preset time interval.

In accordance with an exemplary embodiment, the sensing unit may include at least one of a terrestrial magnetism sensor, a gyro sensor and an acceleration sensor configured to measure the direction that the wrist faces by the preset time interval, and the controller may control the display to change the display area for displaying the screen information on the display according to the direction that the wrist faces.

In accordance with an exemplary embodiment, the controller may control the display to change a display direction of the screen information displayed on the display area according to the direction that the wrist faces.

In accordance with an exemplary embodiment, the sensing unit may include a plurality of camera sensors disposed on different positions of the display, and the controller may control the display to change the display area for displaying the screen information on the display based on a user's eyes, sensed by the camera sensors.

In accordance with an exemplary embodiment, the controller may change the display area for displaying the screen information on the display based on the flatness of the wrist and the direction that the wrist faces, sensed by the sensing unit, when a movement of the wrist is sensed.

In accordance with an exemplary embodiment, the controller may change a position, a size and a shape of the display area for displaying the screen information.

In accordance with an exemplary embodiment, the display may output a status bar for displaying a current work status, and the controller may display the status bar on one side of the display area in a fixed state.

In accordance with an exemplary embodiment, the display may output first screen information including the status bar on a first display area, selected based on the flatness of the wrist and the direction that the wrist faces, and the controller may display second screen information related to the status bar on the first display area when a touch input is sensed on the status bar. Also, the controller may select one area adjacent to the first display area as a second display area, and display the first screen information on the second display area.

In accordance with an exemplary embodiment, the controller may control an operation involved with the first screen information displayed on the first display area, in response to a movement of the wrist sensed by the sensing unit.

In accordance with an exemplary embodiment, the controller may select a touch point as a display area based on a touch input sensed on the display.

In accordance with an exemplary embodiment, the controller may select a plurality of touch points as a plurality of display areas when a plurality of touch inputs are sensed on the display, and display the same screen information on the plurality of display areas.

In accordance with an exemplary embodiment, the display may output an execution screen of an application, which is being executed on a foreground, on the first display area while a plurality of applications are multitasked. The controller may select one area adjacent to the first display area as a second display area based on a touch input sensed on the display, and display an execution screen of an application, which is being executed on a background, on the second display area.

In accordance with an exemplary embodiment, the controller may swap the screen information displayed on the first and second display areas with each other, in response to a movement of the wrist sensed by the sensing unit.

In accordance with an exemplary embodiment, the controller may terminate the displaying of the screen information on at least one of the first and second display areas, based a touch input sensed on the display.

In accordance with an exemplary embodiment, the display may output a plurality of images on the first display area. The controller may select a plurality of areas including the first display area, based on a touch input sensed on the display, and display the plurality of images on the plurality of display areas.

In accordance with an exemplary embodiment, the display may output screen information including at least one icon, which corresponds to at least one application, on the first display area. The controller may select one area adjacent to the first display area as a second display area when one of the at least one icons is selected, and display an execution screen of an application corresponding to the selected icon on the second display area.

In accordance with an exemplary embodiment, the display may output a contact information list including contact items on the first display area. The controller may select one area adjacent to the first display area as a second display area based on a touch input sensed on one of the contact items, and display a shortcut menu corresponding to the touched contact item on the second display area.

To achieve these and other advantages and in accordance with the purpose of this specification, as embodied and broadly described herein, there is provided a control method for a mobile terminal, in a control method for a mobile terminal comprising a main body to cover at least one area of a wrist, and a display disposed on a front surface of the main body, the method including sensing flatness of the wrist and a direction that the wrist faces, and selecting a display area for displaying screen information on the display based on the flatness of the wrist and the direction that the wrist faces sensed.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

Advantageous Effects of Invention

The mobile terminal may display the screen information on the portion that the user faces on the display by considering the user's eyes. This may result in improvement of user convenience.

BRIEF DESCRIPTION OF DRAWINGS

FIG. 1 is a block diagram of a mobile terminal in accordance with one exemplary embodiment of this specification;

FIGS. 2A and 2B are conceptual views of a communication system operable with the mobile terminal;

FIGS. 3A and 3B are conceptual views illustrating a flexible display included in the mobile terminal;

FIG. 4 is a flowchart illustrating a control method for a mobile terminal in accordance with one exemplary embodiment of this specification;

FIG. 5 is a conceptual view illustrating an exemplary operation that a display area to display screen information changes according to a direction that a wrist faces;

FIG. 6 is a conceptual view illustrating an exemplary operation that a display direction of screen information changes according to the direction that the wrist faces;

FIG. 7 is a conceptual view illustrating an exemplary operation of a display when a touch input is sensed on a status display bar displayed on the display;

FIG. 8 is a conceptual view illustrating an exemplary operation that an operation involved with screen information is controlled according to a movement of the wrist;

FIG. 9 is a conceptual view illustrating an exemplary operation that a display area to display screen information changes according to a touch input onto the display;

FIGS. 10 to 12 are conceptual views illustrating exemplary operations of the display when a touch input is sensed on the display;

FIG. 13 is a conceptual view illustrating an exemplary operation of the display when a touch input is sensed on the display in a state that a plurality of images are displayed;

FIG. 14 is a conceptual view illustrating an exemplary operation of the display when a touch input is sensed on an icon output on the display;

FIG. 15 is a conceptual view illustrating an exemplary operation of the display when a touch input is sensed on a contact item output on the display; and FIGS. 16 to 18 are conceptual views, respectively, illustrating an exemplary operation of the display when an event is generated.

MODE FOR THE INVENTION

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the exemplary embodiments of this specification can be applied to stationary terminals such as digital TV, desktop computers and the like excluding a case of being applicable only to the mobile terminals.

FIG. 1 is a block diagram of a mobile terminal 100 in accordance with one exemplary embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component 110 to 190 is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The sensing unit 140 may include a proximity sensor 141, a stereoscopic touch sensor 142, an ultrasonic wave sensor 143 and a camera sensor 144. The sensing unit 140 may be implemented as a three-dimensional (3D) sensor which detects a location of a moving object (hereinafter, referred to 'target to be sensed'), which is present in a 3D space. Here, the target to be sensed, for example, may be a user's body (e.g., finger), an accessory or the like.

The output unit 150 is configured to output an audio signal, a video signal or a tactile signal. The output unit 150 may include a display unit 151, an audio output module 152, an alarm unit 153 and a haptic module 154.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer or the like.

The alarm unit 153 outputs a signal for informing about an occurrence of an event of the mobile terminal 100. Events generated in the mobile terminal may include call signal reception, message reception, key signal inputs, a touch input etc. In addition to video or audio signals, the alarm unit 153 may output signals in a different manner, for example, using vibration to inform about an occurrence of an event. The video or audio signals may be also outputted via the audio output module 152, so the display unit 151 and the audio output module 152 may be classified as parts of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The controller 180 may also execute a lock state in which a user is restricted from inputting a control command for applications when a state of the mobile terminal meets a set condition. Also, the controller 180 may control a lock screen displayed in the lock state based on a touch input sensed on the display unit 151.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations.

The software codes can be implemented with a software application written in any suitable programming language. Also, the software codes may be stored in the memory 160 and executed by the controller 180.

Hereinafter, description will be given of a communication system operable with the mobile terminal 100 according to the present disclosure.

FIGS. 2A and 2B are conceptual views of a communication system operable with the mobile terminal.

First, as illustrated in FIG. 2A, communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

Hereinafter, further description will relate to a CDMA communication system, but such teachings may be applied equally to other system types including the CDMA wireless communication system.

Referring to FIG. 2A, a CDMA wireless communication system is shown having at least one mobile terminal 100, at least one base station (BS) 270, at least one base station controller (BSC) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 3.

Each base station 270 may include one or more sectors, each sector having an omnidirectional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base station 270 may also be referred to as a Base Station Transceiver Subsystem (BTS). In some cases, the term "base station" may be used to refer collectively to a BSC 275 and at least one base station 270. The base stations may also be denoted as "cell sites." Alternatively, individual sectors of a given base station 270 may be referred to as cell sites.

Still referring to FIG. 2A, a broadcasting transmitter (BT) 295 may transmit a broadcast signal to the mobile terminals 100 operating within the system. The broadcast receiving module 111 (FIG. 1) is typically configured inside the mobile terminal 100 to receive broadcast signals transmitted by the BT 295.

FIG. 3 further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base station 270 receives sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method of acquiring location information related to the mobile terminal using a wireless fidelity (WiFi) positioning system (WPC), with reference to FIG. 2B.

A WiFi positioning system (WPS) 300 refers to a technology of positioning the mobile terminal 100 using a WiFi module provided in the mobile terminal 100 and wireless access points (AP) 320 for transmitting or receiving wireless signals to or from the WiFi module, namely, a wireless local area network (WLAN)-based positioning technology using WiFi.

The WPS 300 may include a WiFi location determination server 310, a mobile terminal 100, wireless APs 320 accessed to the mobile terminal 100, and a database 330 for storing random wireless AP information.

The WiFi location determination server 310 may extract information related to the wireless APs 320 accessed to the mobile terminal 100 based on a location information request message (or signal) of the mobile terminal 100. The information related to the wireless APs 320 accessed to the mobile terminal 100 may be transmitted to the WiFi location determination server 310 via the mobile terminal 100 or to the WiFi location determination server 310 via the wireless APs 320.

The information related to the wireless AP extracted based on the location information request message of the mobile terminal 100 may be at least one of MAC address, SSID, RSSI, channel information, privacy, network type, signal strength, and noise strength.

As such, the WiFi location determination server 310 may receive the information related to the wireless APs 320 accessed to the mobile terminal 100, compare the received information related to the wireless APs 320 with information stored in the pre-constructed database 330, and extract (or analyze) location information related to the mobile terminal 100.

Meanwhile, FIG. 2B has exemplarily illustrated that the wireless APs accessed to the mobile terminal 100 include first, second and third wireless APs 320. However, the number of wireless APs accessed to the mobile terminal 100 may variously change depending on a wireless communication environment where the mobile terminal 100 exists. The WPS 300 may execute positioning of the mobile terminal 100 when the mobile terminal 100 is connected to at least one wireless AP.

Hereinafter, the database 330 which stores random wireless AP information will be described in more detail. The database 330 may store various types of information related to random wireless APs located on different positions.

Examples of the information related to the random wireless APs stored in the database 330 may include MAC address, SSID, RSSI, channel information, privacy, network type, latitude/longitude coordinates of the wireless AP, a name of building where the wireless AP is located, the number of floors, detailed indoor location information (GPS coordinates available), an address and a phone number of an AP owner, and the like.

As such, since the database 300 stores the information related to the random wireless APs and the location information corresponding to the random wireless APs, the WiFi location determination server 310 may search for the wireless AP information corresponding to the information related to the wireless APs 320 accessed to the mobile terminal 100 from the database 330, extract the location information matched by the searched wireless AP information, and acquire location information related to the mobile terminal 100.

The acquired location information related to the mobile terminal 100 may be transmitted to the mobile terminal 100 through the WiFi location determination server 310. Accordingly, the mobile terminal 100 may acquire the location information.

Meanwhile, according to the present disclosure, information processed in the mobile terminal 100 may be displayed using a flexible display. Hereinafter, the flexible display will be described in more detail, with the accompanying drawings.

FIGS. 3A and 3B are conceptual views illustrating a flexible display 151 included in the mobile terminal 100.

As illustrated in FIGS. 3A and 3B, a flexible display 151 may include a display, which can be bent, curved, folded, or rolled by an external physical force applied. Here, the flexible display 151 may include both a general flexible display and an e-paper.

Here, the general flexible display refers to a display which is light and infrangile by being fabricated on a thin flexible substrate, which can be bent, curved, folded or rolled, like a paper, with still having display characteristics of the conventional flat panel displays.

Also, the e-paper uses a display technology to which characteristics of general inks are applied. The e-paper may be different from the general flat panel display in view of using reflected light. The e-paper may change pictures (drawing) or characters using a twist ball or electrophoresis using capsules.

In the meantime, the flexible display 151 may include a sensing unit 140 (see FIG. 1) thereon. The sensing unit 140 may sense bending-related information (or bending information) related to the flexible display 151. The term 'bending' disclosed herein may include meanings of 'curving,' 'rolling,' 'folding,' and the like.

The sensing unit 140 may be disposed overall or partially on the flexible display 151, and sense the bending information about the flexible display 151. Here, the bending information of the flexible display 151 may include a direction, a level, a position and a time that the flexible display is bent, an acceleration that the flexible display bent is restored to its original state, and the like. In addition, the bending information may be various information sensible due to the flexible display being bent.

The controller 180 may also change information displayed on the flexible display 151 or generate a control signal for controlling a function of the mobile terminal, based on the bending information on the flexible display 151 sensed by the sensing unit 140.

For example, referring to FIGS. 3A-(A) and 3A-(B), when the flexible display 151 is bent by an external physical force, the controller 180 may rearrange, divide, combine or change a curve of a screen image, which has been previously displayed on the flexible display 151, based on the bent direction, the bent angle, and a restoring acceleration to the original state of the flexible display 151.

As one embodiment, referring to FIGS. 3A-(A) and 3A-(B), when the flexible display 151 is bent inwardly by an external physical force, the controller 180 may display a screen image displayed on the flexible display 151 to be adjacent to each other. As another embodiment, when the flexible display 151 is bent outwardly by an external physical force, the controller 180 may display the screen image displayed on the flexible display 151 to be spaced from each other.

Besides, the controller 180 may control the method of displaying information on the flexible display 151 in various manners such that a user can accurately recognize the information displayed on the flexible display 151 in response to the flexible display 151 being bent.

Referring to FIG. 3B, the mobile terminal 100 may include a case which surrounds the flexible display 151. The case may be configured to be bent together with the flexible display 151 by an external physical force, taking in account the characteristic of the flexible display 151.

Meanwhile, as aforementioned, the controller 180 may generate the control signal related to the function of the mobile terminal 100 in correspondence with the bending information related to the flexible display 151.

As described above, the mobile terminal 100 is evolving into designs of various shapes. Accordingly, the flexible display is getting highlighted in view of a light weight and an infrangible property. The flexible display may derive creation of new user interface areas to which the conventional glass substrate-based displays have been limitedly applied or unable to be applied. As the flexible display is highlighted, needs of user interfaces using the properties of the flexible display are increasing.

Hereinafter, description will be given of the mobile terminal 100, capable of improving user convenience in displaying screen information on a display 151 of the mobile terminal 100, which is worn around a user's wrist, and a control method thereof, with reference to the accompanying drawings.

FIG. 4 is a flowchart illustrating a control method for a mobile terminal 100 in accordance with one exemplary embodiment of this specification. The mobile terminal 100 may include a display 151 (see FIG. 1), a sensing unit 140 (see FIG. 1), and a controller 180 (see FIG. 1). Here, the display 151 may include a flexible display and other types of displays.

Referring to FIG. 4, flatness of a wrist and a direction that the wrist faces may be sensed (S110).

A body of the mobile terminal 100 may be implemented into a shape of surrounding (covering, being worn on) the wrist using the bendable characteristic of the flexible display 151.

The sensing unit 140 may include a flatness sensing sensor which is disposed on one surface of the display 151 to measure the flatness of the wrist in real time or by a preset time interval.

Also, the sensing unit 140 may include a sensor which measures the direction that the wrist faces in real time or by a preset time interval.

As one embodiment of sensing the direction that the wrist faces, the sensing unit 140 may include a motion recognition sensor (not shown). The motion recognition sensor may include at least one of a terrestrial magnetism sensor, a gyro sensor and an acceleration sensor.

The terrestrial sensor may be a sensor which detects a direction and a size of a terrestrial magnetism, and generates an electric signal using the detected results. The gyro sensor may be a sensor which detects a rotation speed of the main body and generates an electric signal using the detected rotation speed. The acceleration sensor may be a sensor which measures a direction of gravity acceleration, detects an acceleration variation in one direction, and generates an electric signal using the measured and detected results.

Accordingly, the sensing unit 140 may sense whether or not the wrist is rotated. That is, the sensing unit 140 may detect displacement in response to the rotation of the wrist, namely, a rotation direction and a rotation angle of the wrist, and generate an electric signal using the detected displacement. By detecting the rotation direction and the rotation angle of the wrist, the sensing unit 140 may sense a direction that the body covering the wrist faces.

As another embodiment of sensing the direction that the wrist faces, the sensing unit 140 may include an eye search element (not shown). The eye search element may search for a user's eyes using at least one of a camera sensor 121 (see FIG. 1) and an infrared sensor (not shown). The camera sensor may be provided in plurality.

In detail, infrared ray emitted from the infrared sensor may be reflected on the retina of the user's eye within a predetermined viewing range based on the display 151. The reflected ray may be input into the eye search element. Afterwards, the eye search element may search for the user's visual field using the input infrared ray or a user image obtained by the camera sensor 121. Accordingly, the sensing unit 140 may sense at which portion of the display 151 the user is looking.

As another embodiment of sensing the direction that the wrist faces, the sensing unit 140 may include a light sensor (not shown). The light sensor may sense external light and detect a portion of the display 151 that faces the ground.

Afterwards, a display area on which screen information is to be displayed on the display 151 may be selected based on the sensed flatness of the wrist and the direction that the wrist faces (S120).

The controller 180 may select the display area for displaying the screen information on the display 151 by considering both the sensed flatness of the wrist and the direction that the wrist faces. In detail, the controller 180 may change a position, a size and a shape of the display area for displaying the screen information.

In addition, when a movement of the wrist is sensed after the screen information is displayed on the display area, the controller 180 may change the display area for displaying the screen information on the display 151 by considering both the flatness of the wrist and the direction that the wrist faces, which are newly sensed by the sensing unit 140.

Also, the controller 180 may control the display 151 to change the display direction of the screen information displayed on the display area according to the direction that the wrist faces. Accordingly, the controller 180 may display the screen information in a portrait type or a landscape type according to the direction that the wrist faces.

As described above, the mobile terminal 100 according to the one exemplary embodiment may decide the display area for displaying the screen information on the display 151 based on the flatness of the wrist. Accordingly, the mobile terminal 100 may display the screen information on the flat portion of the display 151, thereby reducing distortion of the screen information.

Also, the mobile terminal 100 according to the another exemplary embodiment may decide the display area for displaying the screen information on the display 151 based on the direction that the wrist faces. Accordingly, the mobile terminal 100 may display the screen information on the portion that the user faces on the display 151 by considering the user's eyes. This may result in improvement of user convenience.

FIG. 5 is a conceptual view illustrating an exemplary operation that the display area to display the screen information changes according to the direction that the wrist faces. FIG. 6 is a conceptual view illustrating an exemplary operation that the display direction of the screen information changes according to the direction of the wrist faces.

As illustrated in FIG. 5A and FIG. 6A, the controller 180 may select a display area 251 on which screen information is to be displayed on the display 151 based on the flatness of the wrist and the direction that the wrist faces, both sensed by the sensing unit 140. In detail, the controller 180 may select a position, a size and a shape of the display area 251. Accordingly, a flat portion of the display 151 within the viewing range of the user's eyes may be decided as the display area 251.

For example, as illustrated, in a state that a lower side of the wrist faces the ground, a flat portion of an upper side of the wrist may be decided as the display area 251. The controller 180 may display screen information 261 on the decided display area 251. Here, the screen information 261 may indicate every information displayed on at least partial area of the display 151.

Here, referring to FIG. 5B, when a movement of the wrist is sensed, the controller 180 may change the display area 251 for displaying the screen information 261 on the display 151 based on the flatness of the wrist and the direction that the wrist faces, newly sensed by the sensing unit 140.

For example, as illustrated, when a right side of the wrist faces the ground in response to the movement of the wrist, the flat portion within a left side of the wrist may be newly decided as the display area 251. Accordingly, the controller 180 may display the screen information 261 on the newly decided display area 251.

Referring to FIG. 6B, when the direction that the wrist faces has been changed in response to the movement of the wrist sensed, the controller 180 may change the display direction of the screen information 261 displayed on the display 151 based on the newly sensed direction that the wrist faces.

For example, as illustrated, when the wrist is rotated by a preset angle (for example, 90°), the controller 180 may rotate the display direction of the screen information 261 by the preset angle (for example, 90°). Accordingly, the controller 180 may change the display direction of the screen information 261 to face the ground.

Although not shown, the controller 180 may recognize the user's eyes to detect a viewing direction and a viewing angle of the user's eyes. Afterwards, the controller 180 may change the display direction of the screen information 261 based on the detected information. Accordingly, the screen information 261 may be displayed in a diagonal shape.

FIG. 7 is a conceptual view illustrating an exemplary operation of the display 151 when a touch input is sensed on a status display bar 264 displayed on the display 151.

As illustrated in FIG. 7A, the display 151 may display a status display bar. The status display bar may also be referred to as a status bar 264, and refer to a message line that indicate a current operation status of the mobile terminal 100.

The controller 180 may display first screen information 261 on a first display area 251. The controller 180 may display the statue bar 264 on one side surface of the first display area 251 in a fixed state. As illustrated, the status bar 264 may be displayed on an upper side of the first display area 251.

If another display area has been set in addition to the first display area 251 where the first screen information 261 is displayed, the status bar 264 may be continuously displayed only on one side of the first display area 251. For example, when a second display area 252 is set on one area adjacent to the first display area 251 and second screen information 262 is displayed on the second display area 252, the status bar 264 may be continuously displayed on one side of the first display area 251 without being displayed on the second display area 252.

Referring to FIG. 7B, when a touch input is sensed on the status bar 264, the controller 180 may display the second screen information 262 related to the status bar 264 on the first screen region 251. Here, the second screen information 262 may refer to screen information indicating a current operation status of the mobile terminal 100 in detail.

Simultaneously, the controller 180 may select one area adjacent to the first display area 251 as the second display area 252. The controller 180 may then display the first screen information 261, which has been displayed on the first display area 251, on the second display area 252.

FIG. 8 is a conceptual view illustrating an exemplary operation that an operation involved with screen information is controlled according to the movement of the wrist.

The controller 180 may control an operation involved with the first screen information 261 displayed on the first display area 251, in response to the movement of the wrist sensed by the sensing unit 140.

For example, referring to FIG. 8A, the controller 180 may display the first screen information 261 on the first display area 251. Here, the first screen information 261 may include an execution screen of a music player application. As illustrated, the controller 180 may display a playback screen 261 for a currently played music (for example, a first music) on the first display area 251.

Here, referring to FIGS. 8B and 8C, when the wrist is rotated by a preset angle in a preset direction (for example, a first direction) and thereafter rotated back, the controller 180 may playback a second music, which is the following music of the currently played first music in a playback list. Accordingly, referring to FIG. 8C, the controller 180 may display a playback screen 261' for the second music on the first display area 251.

As such, the controller 180 may control an operation involved with the first screen information 261 displayed on the first display area according to the rotation direction of the wrist. That is, the controller 180 may decide whether to playback a previous music or the next music of the currently played music according to the direction that the wrist is rotated. Similarly, although not shown, in a state that a video playback screen is displayed on the first display area 251, the controller 180 may decide whether to playback a previous video or the next video of a currently played video according to the direction that the wrist is rotated.

As another example, although not shown, when an image is displayed on the first display area 251, the controller 180 may decide whether to delete the image or enter a folder including the image according to the direction that the wrist is rotated.

Also, when a webpage is displayed on the first display area 251, the controller 180 may decide whether to display a previous page or the next page of the currently displayed webpage according to the direction that the wrist is rotated.

When a call signal reception screen is displayed on the first display area 251, the controller 180 may decide whether to receive a call signal or deny the reception of the call signal according to the direction that the wrist is rotated.

When the first screen information 261 is displayed on the first display area 251 and a section is selected from the first screen information 261, the controller 180 may decide whether to copy or crop the selected section according to the direction that the wrist is rotated.

In addition, the controller 180 may control the operation associated with the first screen information 261 displayed on the first display area 251 according to a rotation angle of the wrist. Here, the display 151 may display an image object indicating the rotation angle of the wrist.

FIG. 9 is a conceptual view illustrating an exemplary operation that a display area to display screen information changes according to a touch input onto the display 151.

The controller 180 may select a touch point as a display area based on a touch input sensed on the display 151. When a plurality of touch inputs are sensed on a plurality of points of the display 151, the controller 180 may select the plurality of touch points as a plurality of display areas. The controller 180 may display the same screen information on the plurality of display areas.

Referring to FIG. 9A, the controller 180 may display first screen information 261 on a first display area 251. Here, when a plurality of touch inputs (hereinafter, referred to as 'first and second touch inputs') are sensed on a plurality of points (hereinafter, referred to as 'first and second points'), referring to FIG. 9B, the controller 180 may select the first point of the first display area 251, to which the first touch input has been applied, as the first display area 251 and display the first screen information 261 on the first display area 251.

Referring to FIG. 9C, the controller 180 may select the second point of the display 151, to which the second touch input has been applied, as a second display area 252, and display the first screen information 261 on the second display area 252.

As described, the same screen information may be displayed on the plurality of touch points of the display 151, which may allow the user to share the same screen information with another party.

FIGS. 10 to 12 are conceptual views illustrating an exemplary operation of the display 151 when a touch input is sensed on the display 151 during multitasking.

As illustrated in FIG. 10A, the controller 180 may display the first screen information 261 on the first display area 251. The first screen information 261 may include a home screen.

In accordance with this exemplary embodiment of the present disclosure, the mobile terminal 100 may execute a multitasking function. The term 'multitasking' disclosed herein refers to simultaneously executing a plurality of applications. The plurality of applications may be applications which are linked to one another or independent of one another. That is, the multitasking is not limited to accompanying with or compensating for one application but refers to simultaneously executing several independent applications which have the same level. Here, the application indicates one of various additional functions, such as an Online service, a message function, a call function, a camera function, a playback of video or music files, and the like.

For example, the term 'being executed' or 'being performed' refers to a state before an application is terminated after the application is executed. The term 'activation' of an application refers to a state that an application which is being executed is displayed on a foreground other than a background of the display. On the other hand, the term 'deactivation' of an application refers to a state that an application which is being executed is displayed on the background other than the foreground of the display.

Referring back to FIG. 10A, the controller 180 may display the first screen information 261 including a home screen on the first display area 251. Although not shown, the controller 180 may display on the first display area 251 the first screen information 261, which includes an execution screen of an application, which is being executed on the foreground, while a plurality of applications are multitasked.

Here, when a touch input (for example, a pinch-in input) is sensed on the display 151, although not shown, the controller 180 may provide an effect, which each execution screen of the plurality of applications being currently executed is overlaid on the rear of an execution screen of the application executed on the foreground, for a preset time.

Referring to FIG. 10B, the controller 180 may select a plurality of areas adjacent to the first display area 251 as a plurality of different display areas (hereinafter, referred to as 'second and third display areas') 252 and 253. The controller 180 may display a plurality of screen information (hereinafter, referred to as 'second and third screen information') 262 and 263, which include execution screens of a plurality of applications being executed on the background, respectively, on the second and third display areas 252 and 253.

Referring to FIG. 11A, as aforementioned, the controller 180 may display the first to third screen information 261 to 263 on the first to third display areas 251 to 253.

Referring to FIGS. 11B and 11C, the controller 180 may switch the screen information displayed on the first to third display areas 251 to 253 in response to the movement of the wrist sensed by the sensing unit 140. Although not shown, the controller 180 may swap two screen information displayed on two display areas with each other.

Referring to FIGS. 11B and 11C, when the wrist is rotated by a preset angle in a preset direction (for example, a first direction) and then rotated back, the controller 180 may display the second screen information 262 on the first display area 251 and the first screen information 261 on the third display area 253. Also, the controller 180 may terminate the displaying of the screen information on the second display area 252.

Referring to FIG. 12A, the controller 180 may display the first to third screen information 261 to 263 on the first to third display areas 251 to 253. Here, referring to FIG. 12B, the controller 180 may terminate the displaying of screen information on at least one of the first to third display areas 251 to 253 based on a touch input sensed on the display 151.

In detail, referring to FIG. 12A, when a preset touch input (for example, a drag input) is sensed on one (for example, the third display area 253) of the first to third display areas 251 to 253, the controller 180, as illustrated in FIG. 12B, may terminate the displaying of the third screen information 263 on the third display area 253 on which the touch input has been sensed.

In addition to this, although not shown, the controller 180 may terminate an execution of an application which has been executed on the third display area 253.

FIG. 13 is a conceptual view illustrating an exemplary operation of the display 151 when a touch input is sensed on the display 151 in a state that a plurality of images are displayed.

As illustrated in FIG. 13A, the controller 180 may display the first screen information 261 on the first display area 251. Here, the first screen information 261 may include a plurality of images (hereinafter, referred to as 'first to fourth images') 265a to 265d.

Here, when a preset touch input (for example, pinch-in input) is sensed on one of the first to fourth images 265a to 265d, as illustrated in FIG. 13B, the controller 180 may select a plurality of areas (hereinafter, referred to as 'first to fourth display areas') 251 to 254 including the first display area 251, and display the first to fourth images 265a to 265d on the first to fourth display areas 251 to 254.

In detail, the controller 180 may display an enlarged image 266b of the image 265b, on which the touch input has been sensed, on the first screen region 251. In addition, the controller 180 may display enlarged images 266b to 266d of the second to fourth images 265b to 265d on the second to fourth display areas 252 to 254 based on sequence information related to the first to fourth images 265a to 265d being arranged in FIG. 13A.

Although not shown, even when a user detaches the body of the mobile terminal 100 from the wrist, the controller 180 may continuously display the first to fourth images 265a to 265d on the first to fourth display areas 251 to 254.

FIG. 14 is a conceptual view illustrating an exemplary operation of the display 151 when a touch input is sensed on an icon displayed on the display 151.

As illustrated in FIG. 14A, the controller 180 may display the first screen information 261 on the first display area 251. Here, the first screen information 261 may include at least one icon corresponding to at least one application. As illustrated, the first screen information 261 may include a home screen including a plurality of icons.

Here, when one (for example, an icon corresponding to a music player application) 268 of the plurality of icons is selected, as illustrated in FIG. 14B, the controller 180 may select one area adjacent to the first display area 251 as a second display area 252. The controller 190 may then display the second screen information 262, which includes an execution screen of the music player application corresponding to the selected icon 268, on the second display area 252.

FIG. 15 is a conceptual view illustrating an exemplary operation of the display 151 when a touch input is sensed on a contact item displayed on the display 151.

As illustrated in FIG. 15A, the controller 180 may display first screen information 261 on a first display area 251. Here, the first screen information 261 may include a contact information list including contact items.

Here, when a preset touch input (for example, a drag input from up to down) is sensed on one 269 of the contact items, as illustrated in FIG. 15B, the controller 180 may select as the second display area 252 one area, which is located in the dragging direction (i.e., the downward direction) among areas adjacent to the first display area 251. The controller 180 may display a shortcut icon 270 corresponding to the selected contact item on the second display area 252.

Although not shown, when a drag input from down to up is sensed on the one 269 of the contact items, the controller 180 may select as the second display area 252 one area, located in the dragging direction (i.e., upward direction) among areas adjacent to the first display area 251.

FIGS. 16 to 18 are conceptual views illustrating an exemplary operation of the display 151 when an event is generated.

Referring to FIGS. 16A and 17A, the controller 180 may display first screen information 261 on a first display area 251. Here, the first screen information 261 may include an execution screen of a music player application.

Here, when an event involved with an application which is being executed on a background is generated, the controller 180 may display a pop-up window 271, which indicates the generation of the event, on the first screen information 261.

Referring to FIGS. 16B and 17B, when the wrist is rotated by a preset angle (for example, a first angle) in a preset direction (for example, a first direction), the controller 180 may select a second display area 252 based on flatness of the wrist and a direction that the wrist faces, which have newly been sensed. The controller 180 may display second screen information 262, which includes information related to the generated event, on the second display area 252. As illustrated, message information received may be fully displayed on the second display area 252 or preview information related to the received message information may be displayed on the second display area 252. Here, the first screen information 251 may be continuously displayed on the first display area 251.

Afterwards, when a preset touch input is sensed on the second display area 252 and the wrist is rotated back to the original direction, as illustrated in FIG. 16C, the controller 180 may display the second screen information 262 on the first display area 251. In addition to this, the controller 180 may display the first screen information 261, which has been displayed on the first display area 251, on a third display area 253 as a new display area.

Meanwhile, when the wrist is rotated back to the original direction without a touch input sensed on the second display area 252, as illustrated in FIG. 17C, the controller 180 may restore displaying of screen information. Accordingly, the controller 180 may continuously display the first screen information 261 on the first display area 251 and terminate the displaying of the second screen information 262 on the second display area 252.

Referring to FIG. 18A, the controller 180 may display the first screen information 261, which includes an execution screen of a music player application, on the first display area 251. Here, when an event, which is involved with an application being executed on a background, is generated, the controller 180 may display a pop-up window 271, which indicates the generation of the event, on the first screen information 261.

Referring to FIG. 18B, when the wrist is rotated in an opposite direction, the controller 180 may select the second display area 252 on an opposite side of the wrist based on flatness of the wrist and the direction that the wrist faces, which have been newly sensed. The controller 180 may display the second screen information 262, which includes the information related to the generated event, on the second display area 252.

Although not shown, the first screen information 261 may be continuously displayed on the first display area 251. Also, the playbacking of the music player application being executed on the first display area 251 may be paused.

Afterwards, referring to FIG. 18C, when the wrist is rotated back to the original direction, the controller 180 may playback again the music player application, which has been paused, on the first display area 251. Although not shown, the controller 180 may terminate the displaying of the second screen information 262 on the second display area 252.

As described above, a mobile terminal in accordance with one exemplary embodiment may decide a display area for displaying screen information on a display based on flatness of a wrist. Accordingly, the mobile terminal can display screen information on a flat portion of the display, reducing distortion of the screen information.

Also, a mobile terminal in accordance with another exemplary embodiment may decide a display area for displaying screen information on a display based on a direction that a wrist faces. Accordingly, the mobile terminal can display screen information on a portion of the display viewed by a user's eyes, taking into account the user's eyes, resulting in improvement of user convenience.

Further, in accordance with one embodiment of the present disclosure, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal comprising:
a main body shaped to cover at least one area of a wrist;
a display disposed on a front surface of the main body;
a sensing unit configured to sense orientation of the display changeable according to movement of the wrist, the sensing unit comprising a flatness sensing sensor disposed on one surface of the display and configured to measure flatness of the wrist; and
a controller configured to:
cause the display to display a first execution screen of a first application on a first display area of the display;
cause the display to display a pop-up window, indicating an event related to a second application that is different from the first application, on the first display area when the event occurs while the first execution screen is displayed on the first display area;
select a second display area of the display based on flatness of the wrist measured by the flatness sensing sensor and a direction that the wrist faces when a first rotation of the wrist is sensed by the sensing unit, the first rotation corresponding to a rotation by a preset angle in a first direction;
cause the display to display a second execution screen of the second application that includes information related to the event on the second display area in response to the first rotation of the wrist while the first execution screen is continuously displayed on the first display area when the second execution screen is displayed on the second display area;
determine whether to display the second execution screen on the first display area screen or to stop the displaying of the second execution screen in response to a second rotation of the wrist, the second rotation corresponding to a rotation in a second direction that is opposite to the first direction;
cause the display to display the second execution screen, instead of the first execution screen, on the first display area in response to the second rotation when a preset touch input is sensed on the second display area prior to the second rotation;
cause the display to display the first execution screen on a third display area of the display when the second execution screen is displayed on the first display area in response to the preset touch input and the second rotation; and
cause the display to continue displaying the first execution screen on the first display area, terminating the displaying of the second execution screen on the second display area, in response to the second rotation when the preset touch input is not sensed on the second display area prior to the second rotation.

2. The terminal of claim 1, wherein the display comprises a flexible display capable of being curved to cover the at least one area of the wrist.

3. The terminal of claim 2, wherein the pop-up window is displayed on the first execution screen.

4. The terminal of claim 1, wherein the sensing unit further comprises at least one of a terrestrial magnetism sensor, a gyro sensor, or an acceleration sensor configured to detect the movement of the wrist or determine the orientation of the display, and
wherein the controller is further configured to cause the display to change at least a display position or a display size of a display area on the display according to the detected movement of the wrist or the determined orientation of the display.

5. The terminal of claim 4, wherein both the display position and the display size of the display area are changed according to the detected movement of the wrist or the determined orientation of the display.

6. The terminal of claim 1, wherein the sensing unit further comprises a plurality of camera sensors disposed on different positions of the display, and
wherein the controller is further configured to cause the display to change the display area on the display based on a user's eyes sensed by the camera sensors.

7. The terminal of claim 4, wherein the display position of the display area is changed on the display in response to the movement of the wrist.

8. The terminal of claim 7, wherein the display size of the display area is changed when the display position is changed.

9. The terminal of claim 1, wherein the first application comprises a music player application.

10. The terminal of claim 9, wherein the second application comprises a messaging application.

11. The terminal of claim 1, wherein the first rotation of the wrist occurs while the first execution screen is displayed on the first display area.

12. The terminal of claim 1, wherein the second display area is located next to the first display area on the display.

13. The terminal of claim 1, wherein the controller is further configured to:
select a plurality of touch points as a plurality of display areas when a plurality of touch inputs are sensed on the display; and
cause the display to display the same screen information on the plurality of display areas.

14. The terminal of claim 1, wherein the controller is further configured to:
cause the display to display an execution screen of an application, which is being executed on a foreground, on the first display area of the display while a plurality of applications are multitasked; and
select one area of the display adjacent to the first display area as the second display area based on a touch input sensed on the display while the execution screen is displayed on the first display area; and
cause the display to display an execution screen of an application, which is being executed on a background, on the second display area.

15. The terminal of claim 14, wherein the controller is further configured to swap first information displayed on the second display area and second screen information displayed on the first display area with each other in response to movement of the wrist sensed by the sensing unit while the first and second screen information are displayed on the second and first display areas, respectively.

16. The terminal of claim 15, wherein the controller is further configured to stop the displaying of at least one of the first or second screen information on at least one of the first or second display area based a touch input sensed on the display while both the first and second screen information are displayed.

17. The terminal of claim 1, wherein the controller is further configured to:
cause the display to display a plurality of images on the first display area of the display; and
select a plurality of areas including the first display area based on a touch input sensed on the display while the plurality of images are displayed; and
cause the display to display the plurality of images on the plurality of display areas.

18. The terminal of claim 1, wherein the controller is further configured to:
cause the display to display screen information including at least one icon on the first display area of the display, the at least one icon corresponding to at least one application; and
select one area adjacent to the first display area as the second display area when one of the at least one icons is selected; and
cause the display to display an execution screen of an application corresponding to the selected icon on the second display area.

19. The terminal of claim 1, wherein the controller is further configured to:
cause the display to display a contact information list including contact items on the first display area of the display; and
select one area adjacent to the first display area as the second display area based on a touch input sensed on one of the contact items; and
cause the display to display a shortcut menu corresponding to the touched contact item on the second display area.

20. A control method for a mobile terminal comprising a main body shaped to cover at least one area of a wrist and a display disposed on a front surface of the main body, the method comprising:
sensing orientation of the display changeable according to movement of the wrist;
displaying a first execution screen of a first application on a first display area of the display;
displaying a pop-up window, indicating an event related to a second application that is different from the first application, on the first display area when the event occurs while the first execution screen is displayed on the first display area;
selecting a second display area of the display based on flatness of the wrist measured by a flatness sensing sensor and a direction that the wrist faces when a first rotation of the wrist is sensed by a sensing unit, the first rotation corresponding to a rotation by a preset angle in a first direction;
displaying a second execution screen of the second application that includes information related to the event on the second display area in response to the first rotation of the wrist while the first execution screen is continuously displayed on the first display area when the second execution screen is displayed on the second display area;

determining whether to display the second execution screen on the first display area screen or to stop the displaying of the second execution screen in response to a second rotation of the wrist, the second rotation corresponding to a rotation in a second direction that is opposite to the first direction;

displaying the second execution screen, instead of the first execution screen, on the first display area in response to the second rotation when a preset touch input is sensed on the second display area prior to the second rotation;

displaying the first execution screen on a third display area of the display when the second execution screen is displayed on the first display area in response to the preset touch input and the second rotation; and continuing the displaying of the first execution screen on the first display area, terminating the displaying of the second execution screen on the second display area, in response to the second rotation when the preset touch input is not sensed on the second display area prior to the second rotation.

* * * * *